United States Patent
Li et al.

(10) Patent No.: US 12,043,248 B2
(45) Date of Patent: *Jul. 23, 2024

(54) PRECISE TRUCK PARKING METHOD, DEVICE, AND SYSTEM IN QUAYSIDE CONTAINER CRANE AREA

(71) Applicant: Beijing Tusen Zhitu Technology Co., Ltd., Beijing (CN)

(72) Inventors: Yiming Li, Shanghai (CN); Xu Xiao, Shanghai (CN); Yuhe Jin, Shanghai (CN); Jinpeng Cai, Shanghai (CN); Nan Wu, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 399 days.

This patent is subject to a terminal disclaimer.

(21) Appl. No.: 17/360,649

(22) Filed: Jun. 28, 2021

(65) Prior Publication Data
US 2021/0394747 A1 Dec. 23, 2021

Related U.S. Application Data

(63) Continuation of application No. PCT/CN2019/077079, filed on Mar. 6, 2019.

(30) Foreign Application Priority Data

Dec. 26, 2018 (CN) .......................... 201811602327.0

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01);
(Continued)

(58) Field of Classification Search
CPC ...... G01S 17/89; G01S 17/931; G01S 7/4808; G01S 13/08
See application file for complete search history.

(56) References Cited

U.S. PATENT DOCUMENTS

| 9,783,231 B2 * | 10/2017 | Freistadt | ............ B62D 15/0285 |
| 10,078,790 B2 * | 9/2018 | Wang | .................. G06F 18/2431 |

(Continued)

FOREIGN PATENT DOCUMENTS

| CN | 201003950 Y | 1/2008 |
| CN | 103824473 A * | 5/2014 |

(Continued)

OTHER PUBLICATIONS

International Application No. PCT/CN2019/077079, International Search Report and Written Opinion Mailed Oct. 8, 2019, pp. 1-12.
(Continued)

*Primary Examiner* — Redhwan K Mawari
(74) *Attorney, Agent, or Firm* — Perkins Coie LLP

(57) ABSTRACT

A method, a device, and a system for parking a truck accurately in a shore crane area are provided. A vehicle controller transmits a parking request for a truck to be parked. A main controller receives the parking request and acquires real-time point cloud data by scanning one or more lanes crossed by a shore crane using one or more LiDARs. The main controller clusters the real-time point cloud data to obtain a set of point clouds for the truck and applies an Iterative Closest Point algorithm to the set of point clouds and a vehicle point cloud model to obtain a real-time distance from the truck to a target parking space. The vehicle controller controls the truck to stop at the target parking space based on the real-time distance.

20 Claims, 11 Drawing Sheets

(51) Int. Cl.
  *B60W 10/18* (2012.01)
  *B60W 50/00* (2006.01)
  *G01S 7/48* (2006.01)
  *G01S 17/42* (2006.01)
  *G01S 17/931* (2020.01)
  *G06F 18/232* (2023.01)
  *G06T 7/521* (2017.01)
  *G06V 10/75* (2022.01)
  *G08G 1/00* (2006.01)
  *B66C 13/18* (2006.01)
  *B66C 19/00* (2006.01)

(52) U.S. Cl.
  CPC ....... *B60W 50/0098* (2013.01); *G01S 7/4802* (2013.01); *G01S 17/42* (2013.01); *G01S 17/931* (2020.01); *G06F 18/232* (2023.01); *G06T 7/521* (2017.01); *G06V 10/751* (2022.01); *G08G 1/205* (2013.01); *B60W 2050/006* (2013.01); *B60W 2300/12* (2013.01); *B60W 2420/408* (2024.01); *B60W 2556/45* (2020.02); *B66C 13/18* (2013.01); *B66C 19/002* (2013.01); *G06T 2207/10028* (2013.01); *G06V 2201/08* (2022.01)

(56) References Cited

U.S. PATENT DOCUMENTS

| | | | | |
|---|---|---|---|---|
| 10,222,211 | B2* | 3/2019 | Chen | G01C 21/3867 |
| 2016/0225199 | A1* | 8/2016 | Aoki | G07C 5/008 |
| 2017/0356746 | A1* | 12/2017 | Iagnemma | G01C 21/3461 |
| 2017/0356747 | A1* | 12/2017 | Iagnemma | G05D 1/0088 |
| 2017/0356750 | A1* | 12/2017 | Iagnemma | G05D 1/0214 |
| 2017/0356751 | A1* | 12/2017 | Iagnemma | G05D 1/0214 |
| 2018/0275277 | A1* | 9/2018 | Li | G01S 17/89 |
| 2018/0350022 | A1* | 12/2018 | Stefan | G08G 1/202 |
| 2019/0333232 | A1* | 10/2019 | Vallespi-Gonzalez | G06V 20/30 |

FOREIGN PATENT DOCUMENTS

| | | | | | |
|---|---|---|---|---|---|
| CN | 104477779 | B | * | 7/2016 | ............ B66C 13/16 |
| CN | 106541945 | A | | 3/2017 | |
| CN | 106781670 | A | | 5/2017 | |
| CN | 107338988 | A | | 11/2017 | |
| CN | 107481118 | A | * | 12/2017 | |
| CN | 107610524 | A | | 1/2018 | |
| CN | 107728162 | A | | 2/2018 | |
| CN | 107728162 | A | * | 2/2018 | ........... G01S 17/936 |
| CN | 207280514 | U | * | 4/2018 | |
| CN | 108989379 | A | * | 12/2018 | ......... G01C 21/3438 |
| DE | 102012216986 | A1 | * | 3/2014 | ............ B60W 30/06 |
| EP | 2711326 | A1 | * | 3/2014 | ............ B65G 63/004 |
| KR | 20180047210 | A | * | 5/2018 | |
| WO | WO-2018033933 | A1 | * | 2/2018 | ............. B66C 13/46 |

OTHER PUBLICATIONS

Extended European Search Report from corresponding European Patent Application No. 19904786, dated Aug. 16, 2022 (8 pages).
No Author. Japanese Application No. 2021-537079, First Office Action Mailed Dec. 6, 2022, pp. 1-4.
US Patent & Trademark Office, Notice of Allowance for U.S. Appl. No. 17/360,743 mailed Dec. 11, 2023, 7 pages.

* cited by examiner

PRECISE TRUCK PARKING METHOD, DEVICE, AND SYSTEM IN QUAYSIDE CONTAINER CRANE AREA

CROSS-REFERENCE TO RELATED APPLICATIONS

The present disclosure is a continuation of and claims priority to International Application No. PCT/CN2019/077079 entitled "PRECISE TRUCK PARKING METHOD, DEVICE AND SYSTEM IN QUAYSIDE CONTAINER CRANE AREA", filed Mar. 6, 2019 and which claims priority to Chinese Patent Application No. 201811602327.0, titled "PRECISE TRUCK PARKING METHOD, DEVICE AND SYSTEM IN QUAYSIDE CONTAINER CRANE AREA", filed on Dec. 26, 2018, the content of which is incorporated herein by reference in its entirety.

TECHNICAL FIELD

The present disclosure relates to intelligent traffic technology, and more particularly, to a method, a device, and a system for parking a truck accurately in a shore crane area.

BACKGROUND

This section is intended to provide a background or context for the embodiments of the present disclosure as set forth in the claims. The description here is not admitted to be prior art by mere inclusion in this section.

Current vehicle parking schemes typically locate vehicles and parking spaces by using vehicle-mounted positioning devices or vehicle-mounted cameras. Such schemes have disadvantages such as large errors and slow speeds, and are especially not suitable for accurate parking of large trucks.

Shore container cranes, also known as shore cranes, are dedicated cranes for loading/unloading containers onto/from ships at ports and docks. They mainly use dedicated container spreaders for loading/unloading containers onto/from ships. The loading/unloading efficiency of shore cranes directly affects the goods transportation capacity of the port. Efficient loading/unloading operations of shore cranes impose high requirements on parking of trucks, requiring the trucks to be parked quickly and accurately at target parking spaces under shore cranes.

SUMMARY

However, in the existing operations of loading/unloading containers onto/from ships, trucks typically cannot stop accurately at target parking spaces once for all after braking, and the trucks need to be guided manually to move forward and backward to stop accurately, which greatly reduces the efficiency of the operations of loading/unloading containers onto/from ships. Therefore, whether the trucks can be accurately parked becomes a technical difficulty in the current operations of loading/unloading containers onto/from ships.

In view of the above problem, the present disclosure provides a method, a device, and a system for parking a truck accurately in a shore crane area, capable of overcoming or at least partially solving the above problem.

In a first aspect of the embodiments of the present disclosure, a method applied in a main controller for parking a truck accurately in a shore crane area is provided. The method includes: receiving a parking request for a truck to be parked as transmitted by a vehicle controller; acquiring real-time point cloud data obtained by scanning one or more lanes crossed by a shore crane using one or more Light Detection and Rangings (LiDARs); clustering the real-time point cloud data to obtain a set of point clouds for the truck to be parked; and applying an Iterative Closest Point (ICP) algorithm to the set of point clouds for the truck to be parked and a vehicle point cloud model to obtain and transmit a real-time distance from the truck to be parked to a target parking space. The vehicle point cloud model is a set of point clouds obtained by scanning a truck parked at the target parking space using a LiDAR in advance.

In a second aspect of the embodiments of the present disclosure, a method applied in a vehicle controller for parking a truck accurately in a shore crane area is provided. The method includes: transmitting a parking request for a truck to be parked; receiving a real-time distance from the truck to be parked to a target parking space as transmitted by a main controller in response to the parking request; and controlling the truck to be parked to stop at the target parking space based on the real-time distance from the truck to be parked to the target parking space.

In a third aspect of the embodiments of the present disclosure, a main controller is provided. The main controller includes a first processor, a first memory, and a computer program stored on the first memory and executable on the first processor. The first processor is configured to, when executing the computer program, perform the steps of the above method applied in a main controller for parking a truck accurately in a shore crane area.

In a fourth aspect of the embodiments of the present disclosure, a vehicle controller is provided. The vehicle controller includes a second processor, a second memory, and a computer program stored on the second memory and executable on the second processor. The second processor is configured to, when executing the computer program, perform the steps of the above method applied in a vehicle controller for parking a truck accurately in a shore crane area.

In a fifth aspect of the embodiments of the present disclosure, a system for parking a truck accurately in a shore crane area is provided. The system include the above main controller, the above vehicle controller, and one or more LiDARs.

In a sixth aspect of the embodiments of the present disclosure, a shore crane is provided. The shore crane is provided with one or more LiDARs and the above main controller.

In a seventh aspect of the embodiments of the present disclosure, a vehicle is provided. The vehicle is provided with the above vehicle controller.

In an eighth aspect of the embodiments of the present disclosure, a computer readable storage medium is provided. The computer readable storage medium has a computer program stored thereon. The computer program, when executed by a processor, implements the steps of the above method applied in a main controller for parking a truck accurately in a shore crane area.

In a ninth aspect of the embodiments of the present disclosure, a computer readable storage medium is provided. The computer readable storage medium has a computer program stored thereon. The computer program, when executed by a processor, implements the steps of the above method applied in a vehicle controller for parking a truck accurately in a shore crane area.

With the above technical solutions, the present disclosure calculates the real-time distance from the truck to the target parking space using the Iterative Closest Points (ICP) algorithm, and controls the truck to stop at the target parking space accurately once for all based on the real-time distance. The entire parking process is automated without human intervention, capable of achieving centimeter-level accuracy with a low implementation cost and a high portability.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

Throughout the figures, same or corresponding reference numerals indicate same or corresponding elements.

DETAILED DESCRIPTION OF THE EMBODIMENTS

Figure 1:
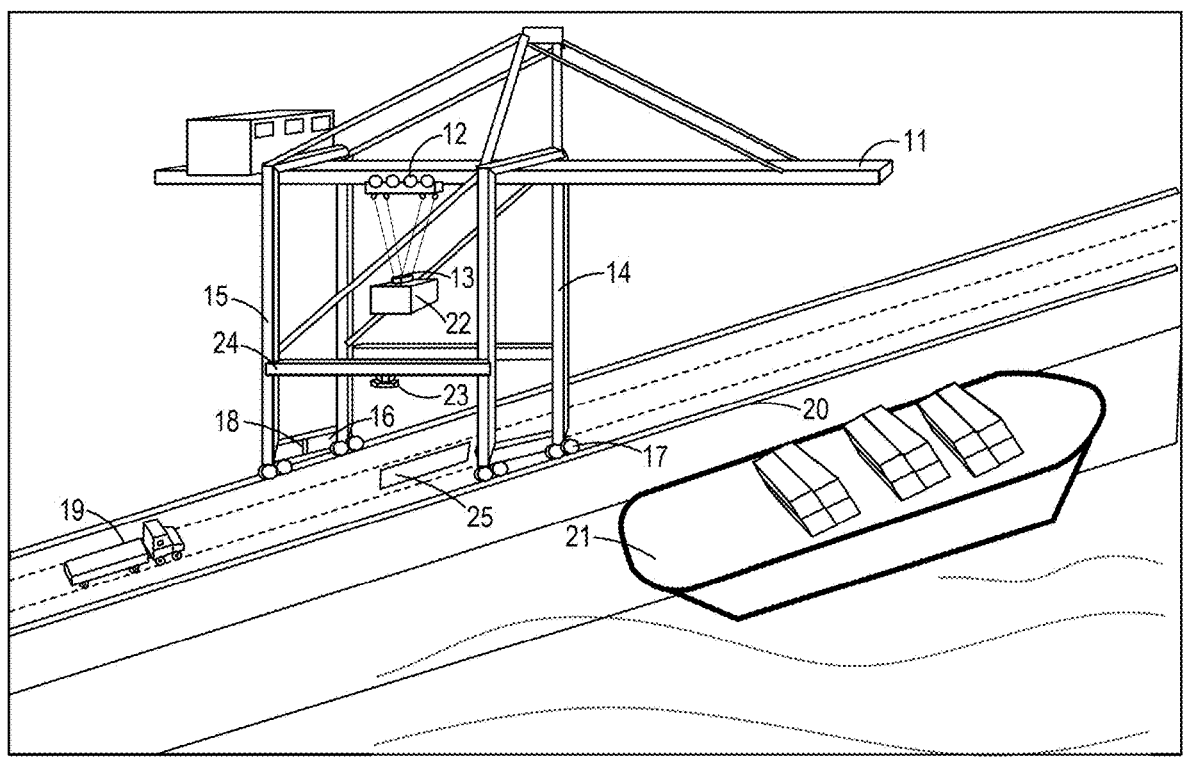
FIG. 1 schematically shows an application scenario according to an embodiment of the present disclosure.

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It can be appreciated by those skilled in the art that the embodiments of the present disclosure can be implemented as a system, apparatus, device, method, or computer program product. Accordingly, the present disclosure may be implemented in hardware only, software only (including firmware, resident software, micro codes, etc.), or any combination of hardware and software.

In order to facilitate understanding of the present disclosure, some of the technical terms used in the present disclosure will be explained as follows:

(1) Target parking space: a position of a truck where a spreader of a shore crane can just lift a container on a load board of the truck or unload a container onto the load board of the truck. Since lanes crossed by the shore crane are parallel and a bridge frame of the shore crane is perpendicular to the lanes, each lane has a target parking space. Along the direction in which each lane extends, the target parking space of the lane has a front end and a rear end. In the direction perpendicular to the lanes, the front ends of the target parking spaces of the respective lanes are in a same straight line, and the rear ends of the target parking spaces of the respective lanes are located on a same straight line.

(2) Parking marking line: a marking indicating that a truck is stopping at a target parking space, e.g., a vertical line drawn on a door frame beam of a shore crane. When the truck stops according to the parking marking line, the truck stops right at the target parking space. Since lanes crossed by the shore crane are parallel, and a bridge frame of the shore crane is perpendicular to the lanes, the target parking spaces of the respective lanes correspond to a same parking marking line.

(3) Iterative Closest Points (ICP) algorithm: an algorithm that can be used to calculate a translation matrix and a rotation matrix between different sets of points.

(4) The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

(5) The term "autonomous vehicle" as used herein refers to any vehicle using the autonomous driving technology to carry people (such as passenger cars, buses, etc.) or goods (such as ordinary trucks, vans, closed trucks, tank trucks, flatbed trucks, container trucks, dump trucks, trucks with special structures, etc.) or provide special rescue functions (such as fire trucks, ambulances, etc.).

It is to be noted that any number of elements in the figures is used as non-limiting examples and any notation is used for the purpose of distinguishing, rather than limiting.

Overview of the Present Disclosure

FIG. 1 is a schematic diagram showing an operation of loading/unloading a container onto/from a ship. As shown in FIG. 1, a shore crane includes a bridge frame 11, a trolley movement mechanism 12, a spreader 13, a sea side door frame 14, a land side door frame 15, a door frame beam 16, a crane movement mechanism 17, a connecting beam 24, and other structures. Here, the connecting beam 24 is a beam that connects the sea side door frame 14 and the land side door frame 15 and crosses a plurality of parallel lanes. Trucks 19 can move freely in these lanes.

During the operation of loading/unloading the container onto/from the ship, the crane movement mechanism 17 moves along a shore rail 20 such that the bridge frame 11 faces a container position of the ship 21. The trolley movement mechanism 12 moves along the bridge frame 11, and the spreader 13 is mounted under the trolley movement mechanism 12 and moves along with it. In the operation of loading the container onto the ship, the spreader 13 moves along the bridge frame 11 to a load board of the truck 19 on which the container is loaded to lift the container 22, and then moves to the container position of the ship 21 to unload the container 22. In the operation of unloading the container from the ship, the spreader 13 moves along the bridge frame 11 to the container position of the ship 21 to lift the container 22, and then moves to the load board of the truck 19 to unload the container 22.

When the container 22 is hoisted, the spreader 13 moves along the bridge frame 11 to operate on the trucks 19 in different lanes. However, the spreader 13 can only move along the bridge frame 11 and cannot move along the direction in which the lanes extend. Thus, along the direction in which the lanes extend, it is necessary for the truck 19 to stop at a position that enables the spreader 13 to lift the container 22 on the load board of the truck 19 or enables the spreader 13 to unload the container 22 onto the load board of the truck 19. That is, the truck 19 needs to stop accurately at the target parking space 25.

In order to allow the truck 19 to accurately stop at the target parking space 25, a parking marking line 18 is drawn on the door frame beam 16 of the shore crane. When the truck 19 stops according to the parking marking line 18, the spreader 13 of the shore crane can just lift the container 22 on the load board of the truck 19 or unload the container 22 onto the load board of the truck 19. Generally, the truck 19 stopping according to the parking marking line 18 means that the truck 19 stops when the truck 19 moves to a position where a side plane of the load board of the truck at the rear of the vehicle (previously referred to as rear side plane of the load board) is coplanar with a vertical plane where the parking marking line 18 is located.

However, after the truck 19 brakes, it is typically different to make the rear side plane of the load board to be coplanar with and the vertical plane where the parking marking line 18 is located once for all. That is, it cannot accurately stop at the target parking space 25 once for all. The truck 19 needs to be guided manually to move forward and backward to stop accurately, which greatly reduces the efficiency of the operations of loading/unloading the container onto/from the ship. Therefore, whether the truck 19 can be accurately parked becomes a technical difficulty in the current operations of loading/unloading containers onto/from ships.

There are some technical solutions to the above problems, for example:

(1) Some technical solutions use a vehicle-mounted Global Positioning System (GPS) or carrier phase differential RTK positioning device to collect a position of a truck to control the truck to stop. However, the GPS or RTK positioning device has strict requirements on the environment and requires the surrounding environment to be open and unobstructed. During the operation of loading/unloading a container onto/from a ship, the truck will stay under the bridge frame of the shore crane, and the large steel structures of the shore crane, such as the sea/land side door frame, the bridge frame, and the beam will seriously block signals of the GPS and RTK positioning device. When the truck enters a certain range around the shore crane, it is impossible to rely on the GPS or RTK positioning device to obtain accurate positioning of the truck itself.

(2) Some technical solutions use vehicle-mounted cameras to visually locate the parking marking line to control the truck to stop. However, due to limitation in algorithms and computing power, such solutions cannot achieve parking with centimeter-level accuracy.

(3) Some other technical solutions use vehicle-mounted LiDARs to locate the parking marking line to control the truck to stop. Such solutions require the area on the shore where the operations of loading/unloading contains onto/from ships may be carried out to be covered with high-reflectivity paint. For busy ports, the paint may be worn seriously and needs to be repaired frequently, resulting in a high cost.

To summarize, it is difficult for the existing solutions to park the truck accurately with vehicle-mounted devices only, and such solutions have high requirements on the vehicle-mounted devices, and have disadvantages such as low accuracy, high cost, low portability, and difficulty in large-scale application.

In view of this, the present disclosure provides a solution for parking a truck accurately in a shore crane area. The solution first uses a LiDAR to scan a truck that has parked at a target parking space to obtain a vehicle point cloud model, and then uses a LiDAR to scan a truck moving towards the target parking space in real time during an operation of loading/unloading a container onto/from a ship, to obtain a set of point clouds for the truck. Next, an ICP algorithm is applied to the set of point clouds and the vehicle point cloud model to obtain the real-time distance from the truck to the target parking space. Finally, the truck is controlled to stop accurately at the target parking space based on the real-time distance.

The solution for parking a truck accurately in a shore crane area according to the present disclosure can achieve centimeter-level accuracy with a low implementation cost and a high portability.

After introducing the basic principles of the present disclosure, various non-limiting embodiments of the present disclosure will be described in detail below.

Overview of Application Scenario

The embodiment of the present disclosure provides an illustrative application scenario. As shown in FIG. 1, a ship berths at a port and a shore crane is located on a shore of the ship's berth. A connecting beam 24 of the shore crane crosses a plurality of lanes, and trucks move in these lanes. One or more LiDARs 23 provided at the bottom of the connecting beam 24 of the shore crane scan these lanes to obtain real-time point cloud data.

After receiving a task of loading/unloading a container onto/from a ship, a truck to be parked moves towards the shore crane. A vehicle controller of the truck to be parked transmits a parking request. A main controller calculates a distance from the moving truck to be parked to a target parking space based on real-time point cloud data obtained by the LiDAR(s) 23. The real-time distance is signaled to the vehicle controller, and the vehicle controller controls the truck to be parked to accurately stop at the target parking space based on the real-time distance.

It is to be noted that the application scenario shown in FIG. 1 is provided only for facilitating understanding of the spirits and principles of the present disclosure, rather than limiting the embodiments of the present disclosure in any way. The embodiments of the present disclosure can be applied to any appropriate scenario.

Exemplary Methods

Figure 2:
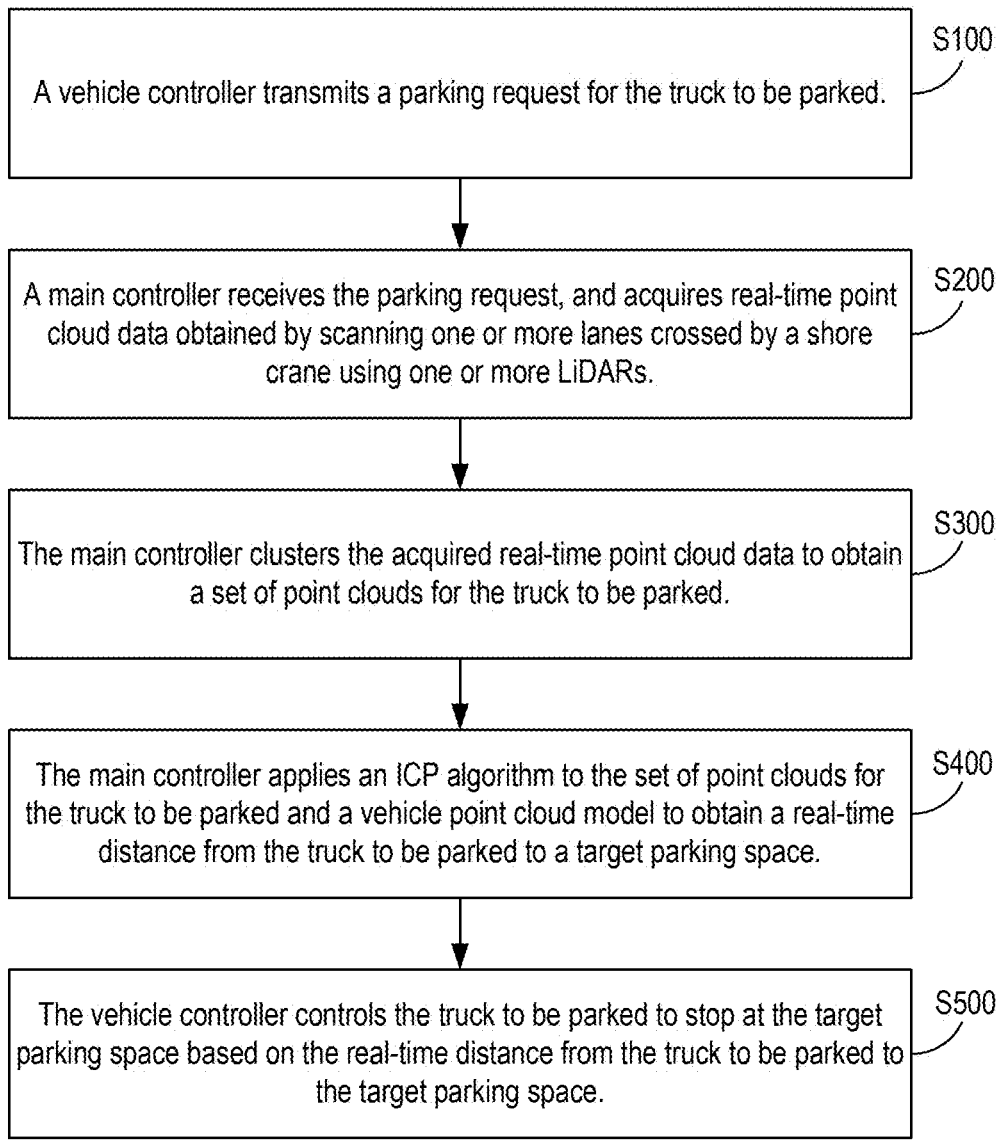
FIG. 2 schematically shows a flow of a method for parking a truck accurately in a shore crane area according to an embodiment of the present disclosure.

In the following, the method for parking a truck accurately in a shore crane area according to an embodiment of the present disclosure will be described with reference to FIG. 2 in conjunction with the application scenario of FIG. 1. As shown in FIG. 2, an embodiment of the present disclosure provides a method for parking a truck accurately in a shore crane area, including the following steps.

At step S100, a vehicle controller transmits a parking request for the truck to be parked.

Since the truck needs to stop accurately at a target parking space when performing an operation of loading/unloading a container onto/from a ship, in a specific implementation, the vehicle controller can transmit the parking request only when determining that a predetermined condition is met. The predetermined condition may be, for example, a distance between the truck and a shore crane (e.g., a distance between vehicle positioning data obtained by a vehicle-mounted positioning device on the truck and a position of the shore crane can be calculated) being smaller than or equal to a predetermined distance, the shore crane being detected (e.g., the shore crane may be detected by applying visual identification on an image captured by a vehicle-mounted camera on the truck), or the like.

In the present disclosure, the vehicle controller can transmit the parking request using wireless communication schemes e.g., via base station, WIFI, and V2X. In some embodiments, the vehicle controller can broadcast the parking request using a V2X device provided on the truck.

In a specific implementation, the parking request transmitted by the vehicle controller may contain one or more of: a shore crane identification, a container identification, a vehicle model of the truck to be parked, a vehicle identification of the truck to be parked, information indicating whether the truck carries a container, positioning data obtained by a vehicle-mounted positioning device on the truck to be parked, a number of a lane where the truck to be parked is located, a MAC address of the vehicle controller, a MAC address of a V2X communication device connected to the vehicle controller, etc.

In some embodiments, after receiving a command for a task of loading/unloading a container onto/from a ship, the vehicle controller obtains information such as the shore crane identification and the container identification by parsing the command for the task of loading/unloading the container onto/from the ship. Here, the shore crane identification identifies the shore crane that the truck to be parked needs to move towards in the task of loading/unloading the container onto/from the ship. The identification can be a number of the shore crane and/or position information of the shore crane (the position information of the shore crane can be obtained by providing a GPS, RTK, or any other positioning device on the shore crane). The container identification identifies the container to be loaded/unloaded by the truck to be parked in the task of loading/unloading the container onto/from the ship. The identification can be a number of the container or the like.

At step S200, a main controller receives the parking request, and acquires real-time point cloud data obtained by scanning one or more lanes crossed by a shore crane using one or more LiDARs.

In some embodiments, the one or more LiDARs may always be in a scanning state, and the main controller can acquire the real-time point cloud data obtained by real-time scanning using the one or more LiDARs immediately after receiving the parking request.

In order to allow the truck to be parked to easily find the container to be loaded/unloaded and the shore crane responsible for loading/unloading the container, in some embodiments, the vehicle controller can transmit the parking request by means of broadcasting, and the shore crane identification can be included in the parking request. The main controller can receive and parse the parking request, and match the shore crane identification included in the parking request with the shore crane corresponding to the main controller itself. If the shore crane identification matches the shore crane, the main controller can establish a communication connection with the vehicle controller of the truck to be parked. For example, the main controller can establish the communication connection with the vehicle controller using the MAC address of the vehicle controller and/or the MAC address of the V2X communication device connected to the vehicle controller.

Here, the shore crane corresponding to the main controller refers to the shore crane that crosses the lane(s) scanned by the LiDAR(s) connected to the main controller, and the main controller is responsible for the tasks of accurately parking the trucks in the one or more lanes under the corresponding shore crane. There can be one or more shore cranes corresponding to the main controller. In a specific implementation, the main controller can have a locally configured list of shore crane identifications of its corresponding shore cranes. When receiving the parking request broadcasted by the vehicle controller, the shore crane identification in the parking request can be matched with the list. When there is a shore crane identification in the list that matches the shore crane identification in the parking request, the main controller can establish a communication connection with the vehicle controller broadcasting the parking request. In this type of embodiment, the vehicle controller searches for a main controller that can establish communication with it by means of broadcasting. In case of successful matching as described above, the communication connection between the vehicle controller and the main controller can be successfully established.

In some embodiments, the main controller can use a V2X device to receive the parking request broadcasted by the vehicle controller.

In some embodiments, the vehicle controller can parse the shore crane identification from the received operation command for loading/unloading the container onto/from the ship, include the shore crane identification in the broadcasted parking request, and control the truck to be parked to move to the shore crane corresponding to the shore crane identification. For example, when a Terminal Management System (TOS) handles tasks for loading/unloading containers onto/from ships, it assigns a container that needs to be loaded/unloaded to a particular shore crane, and according to the assignment, the container identification and the shore crane identification are associated with each other and included in the operation command for loading/unloading the container onto/from the ship as transmitted to the vehicle controller. The container identification indicates which container the truck to be parked needs to load/unload, and the shore crane identification indicates which shore crane the truck to be parked needs to move to.

Figure 3:
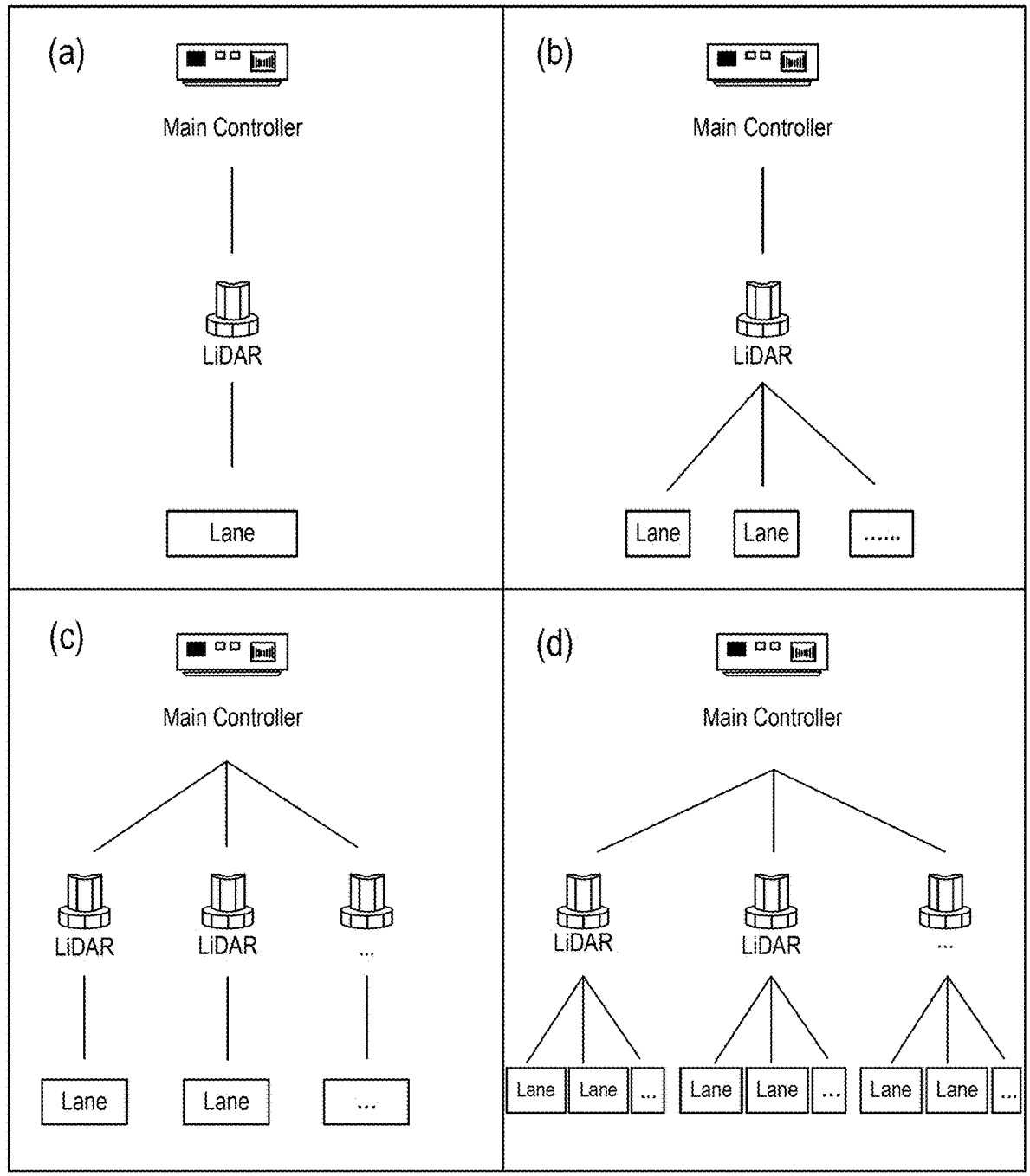
FIG. 3 schematically shows configuration modes of a main controller, one or more LiDARs, and one or more lanes according to an embodiment of the present disclosure.

Since the shore crane typically crosses a plurality of lanes, and the number of laser emission light sources (i.e., the number of lines) and the scanning range of a LiDAR are limited, in general one LiDAR cannot scan all the lanes crossed by the shore crane at the same time. Thus, a plurality of LiDARs need to be configured. In addition, the main controller and the LiDARs are independent devices, and there are various connection modes between them. Taking the above factors into account, in a specific implementation, the main controller, the LiDARs, and lanes can have a number of configuration modes as shown in FIG. 3:

(a) One main controller is connected to only one LiDAR, and one LiDAR is responsible for scanning only one lane;

(b) One main controller is connected to only one LiDAR, and one LiDAR is responsible for scanning at least two lanes;

(c) One main controller is connected to at least two LiDARs, and one LiDAR is responsible for scanning only one lane; and (d) One main controller is connected to at least two LiDARs, and one LiDAR is responsible for scanning at least two lanes.

In a specific implementation, it is possible to determine which configuration mode to use comprehensively based on a total number of lanes crossed by the shore crane, a width of each lane, and the number of lines and the scanning range of each LiDAR. The embodiment of the present disclosure is not limited to any of these examples.

In some embodiments, no matter which of the above configuration modes is used, the vehicle controller may include the number of the lane where the truck to be parked is located in the transmitted parking request. After receiving the parking request, the main controller can determine the lane where the truck to be parked is located based on the number of the lane in the parking request, and then determine the LiDAR configured to scan the lane, so as to obtain the real-time point cloud data obtained by scanning using the LiDAR.

In some embodiments, each main controller can have a locally configured correspondence table between the main controller, the LiDARs, and the numbers of the lanes, so as to determine the LiDAR based on the number of the lane in the parking request.

At step S300, the main controller clusters the acquired real-time point cloud data to obtain a set of point clouds for the truck to be parked.

In particular, when the truck to be parked moves in the lane crossed by the shore crane and enters the scanning range of the LiDAR, a laser beam will be radiated onto the truck to be parked and returned and received by the LiDAR. The real-time point cloud data obtained by scanning will contain point clouds corresponding to the truck to be parked. The set of point clouds for the truck to be parked can be extracted by clustering the real-time point cloud data.

In this step, algorithms that are currently commonly used for clustering arbitrary shapes, such as WaveCluster, ROCK, CURE, K-Prototypes, DENCLUE, DBSCAN, etc., can be used.

Since the shore crane typically crosses a number (for example, six) of lanes, there may be a plurality of trucks moving in these lanes at the same time. Therefore, the real-time point cloud data may contain point clouds corresponding to the plurality of trucks at the same time. In this case, clustering the real-time point cloud data may result in sets of point clouds for the plurality of trucks (including the truck to be parked and other trucks). Taking this into consideration, in order to allow the main controller to obtain the set of point clouds for the truck to be parked by clustering the real-time point cloud data, an embodiment of the present disclosure provides the following schemes.

(1) In some embodiments, the parking request transmitted by the vehicle controller may include the positioning data collected by the vehicle-mounted positioning device on the truck to be parked, and the main controller can cluster the real-time point cloud data to obtain one or more sets of point clouds for one or more trucks, and determine, from the one or more sets of point clouds, a set of point clouds containing the positioning data, as the set of point clouds for the truck to be parked.

In this type of embodiment, positioning data collected by vehicle-mounted positioning devices on different trucks is position information of the different trucks, and the different trucks can be distinguished from each other based on the positioning data. Therefore, the set of point clouds containing the positioning data collected by the vehicle-mounted positioning device on the truck to be parked is the set of point clouds for the truck to be parked.

In a specific implementation, the vehicle-mounted positioning device can be a GPS positioning device, a carrier phase differential RTK positioning device, a Beidou satellite positioning system positioning device, a GLONASS positioning system positioning device, a Galileo positioning system positioning device, a Global Navigation Satellite System (GNSS) positioning device, a Ultra-Wideband (UWB) positioning device, etc.

(2) In some embodiments, the parking request transmitted by the vehicle controller may include the positioning data collected by the vehicle-mounted positioning device on the truck to be parked, and the main controller can extract, from the real-time point cloud data, point cloud data corresponding to a position corresponding to the positioning data and an area within a predetermined length around the position, and cluster the extracted point cloud data to obtain the set of point clouds for the truck to be parked.

In this type of embodiment, the positioning data collected by the vehicle-mounted positioning device on the truck to be parked corresponds to the position information of the truck to be parked. The main controller can determine the position of the truck to be parked based on the positioning data. However, the position corresponding to the positioning data is a point position and cannot represent the position of each part of the entire vehicle body. Therefore, a predetermined length can be determined according to the length of the truck, and then the position corresponding to the positioning data and the area within the predetermined length around the position can be determined. The area can cover the entire vehicle body. The main controller can extract the point cloud data corresponding to the area from the real-time point cloud data, which necessarily contains the point cloud corresponding to the truck to be parked, and cluster the point cloud data to obtain the set of point clouds for the truck to be parked.

(3) In some embodiments, the parking request transmitted by the vehicle controller may include the number of the lane where the truck to be parked is located, and the main controller can extract, from the real-time point cloud data, point cloud data of the lane where the truck to be parked is located based on the number of the lane where the truck to be parked is located and a known position of each lane crossed by the shore crane relative to the one or more LiDARs, cluster the real-time point cloud data to obtain one or more sets of point clouds for one or more trucks, and determine, from the one or more sets of point clouds for the one or more trucks, a set of point clouds having an intersection with the point cloud data of the lane where the truck to be parked is located, as the set of point clouds for the truck to be parked.

In this type of embodiment, when the positions of the one or more LiDARs are determined, the position of each lane crossed by the shore crane relative to the one or more LiDARs can be determined and stored as known information locally in the main controller. The main controller can determine in which lane the truck to be parked is moving based on the number of the lane where the truck to be parked is located. Further referring to the relative position relationship between each lane and the one or more LiDARs, the main controller can extract the point cloud data of the lane where the truck is to be parked from the real-time point cloud data. After clustering the real-time point cloud data to obtain one or more sets of point clouds for one or more trucks, the main controller can find, from the one or more sets of point clouds for the one or more trucks, the set of point clouds having an intersection with the point cloud data of the lane where the truck is to be parked, and determine the set of point clouds as the set of point clouds for the truck to be parked.

It is to be noted that in this type of embodiment, when the shore crane is performing a task, the shore crane crosses the lanes, and a distance between adjacent trucks moving in the same lane needs to be greater than the scanning range of the LiDAR, so as to ensure that there is a set of point clouds for at most one truck in the point cloud data of the lane as obtained by scanning using the LiDAR. For example, when the scanning range of the LiDAR is 40 meters, and the distance between adjacent trucks in the same lane needs to be greater than 40 meters.

(4) In some embodiments, the parking request transmitted by the vehicle controller may include the number of the lane where the truck to be parked is located, and the main controller can extract, from the real-time point cloud data, point cloud data of the lane where the truck to be parked is located based on the number of the lane where the truck to be parked is located and a known position of each lane crossed by the shore crane relative to the one or more LiDARs, and cluster the extracted point cloud data to obtain the set of point clouds for the truck to be parked.

In this type of embodiment, when the positions of the one or more LiDARs are determined, the position of each lane crossed by the shore crane relative to the one or more LiDARs can be determined and stored as known information locally in the main controller. The main controller can determine in which lane the truck to be parked is moving based on the number of the lane where the truck to be parked is located. Further referring to the relative position relationship between each lane and the one or more LiDARs, the main controller can extract the point cloud data of the lane where the truck is to be parked is located from the real-time point cloud data.

It is to be noted that in this type of embodiment, when the shore crane is performing a task, the shore crane crosses the lanes, and a distance between adjacent trucks moving in the same lane needs to be greater than the scanning range of the LiDAR, so as to ensure that there is a set of point clouds for at most one truck in the point cloud data of the lane as obtained by scanning using the LiDAR.

(5) In some embodiments, the parking request transmitted by the vehicle controller may include the positioning data collected by the vehicle-mounted positioning device on the truck to be parked and the number of the lane where the truck is located. The main controller can extract, from the real-time point cloud data, point cloud data of the lane where the truck to be parked is located based on the number of the lane where the truck to be parked is located and a known position of each lane crossed by the shore crane relative to the one or more LiDARs, cluster the real-time point cloud data to obtain one or more sets of point clouds for one or more trucks, and determine, from the one or more sets of point clouds for the one or more trucks, a set of point clouds containing the positioning data and having an intersection with the point cloud data of the lane where the truck to be parked is located, as the set of point clouds for the truck to be parked.

In this type of embodiment, positioning data collected by vehicle-mounted positioning devices on different trucks is position information of the different trucks. Typically, the different trucks can be distinguished from each other based on the positioning data. However, the positioning data obtained by the vehicle-mounted positioning device may have some error, and the lanes under the shore crane are relatively close to each other. In order to distinguish trucks having similar positioning data but in different lanes from each other, the point cloud data containing the positioning data and having an intersection with the point cloud data of the lane where the truck is to be parked can be determined as the set of point clouds for the truck to be parked.

At step S400, the main controller applies an ICP algorithm to the set of point clouds for the truck to be parked and a vehicle point cloud model to obtain a real-time distance from the truck to be parked to a target parking space. Here, the vehicle point cloud model is a set of point clouds obtained by scanning a truck parked at the target parking space using a LiDAR in advance.

The ICP algorithm can be used to calculate a translation matrix and a rotation matrix between different sets of points. The set of point clouds for the truck to be parked is a set of points corresponding to the truck to be parked that is moving, and the vehicle point cloud model is a set of points for a truck accurately parked at the target parking space. Therefore, by applying the ICP algorithm to the above two sets of points, a translation matrix and a rotation matrix between the truck to be parked that is moving and the truck accurately parked at the target parking space. Since the trucks can only move in the lane, the rotation matrix between them can be negligible. According to the translation matrix between them, the real-time distance from the truck to be parked that is moving to the target parking space can be obtained.

Since the trucks for operations of loading/unloading container onto/from ships at the port may have different vehicle models, the sets of point clouds obtained by scanning trucks of different models using the LiDAR will be different. Therefore, in some embodiments, the LiDAR can be configured to scan a plurality of trucks of different vehicle models parked at the target parking space in advance to obtain a plurality of vehicle point cloud models, and store the vehicle point cloud models in a model library. The step S400 can be performed as follows. The main controller can determine the vehicle model of the truck to be parked, select the vehicle point cloud model matching the vehicle model of the truck to be parked from the model library, and apply the ICP algorithm to the set of point clouds for the truck to be parked and the vehicle point cloud model matching the vehicle model of the truck to be parked.

For example, the model library may include a plurality of vehicle point cloud models, a, b, c, d, e, f, and g, corresponding to vehicle models A, B, C, D, E, F, and G, respectively. When the vehicle model of the truck to be parked is F, the main controller can determine that the vehicle point cloud model matching the vehicle model of the truck to be parked is f, and then apply the ICP algorithm to the set of point clouds for the truck to be parked and f.

In order to ensure that all trucks arriving at shore cranes to perform operations of loading/unloading containers onto/from ships can find matching vehicle point cloud models for their respective sets of point clouds, in a specific implementation, the model library needs to include vehicle point cloud models for all vehicle models of trucks performing operations of loading/unloading containers onto/from ships in the port. When a truck of a new vehicle model is added, the vehicle point cloud models in the model library also need to be updated accordingly.

Since the operations of loading/unloading containers onto/from ships can be divided into two types of operations: loading containers onto ships and unloading containers from ships. In an operation of loading a container onto a ship, the truck carries the container to the target parking space under the shore crane, and the spreader lifts the container from the load board of the truck to the ship. In this process, when the truck is moving towards the target parking space, it has the container on its load board. In an operation of unloading a container from a ship, the truck moves to and stops at the target parking space under the shore crane, and the spreader lifts the container from the ship to the load board of the truck. The truck then carries the container to a yard for storage. In this process, when the truck is moving towards the target parking space, the load board is empty. It can be seen that in the operation of loading the container onto the ship and the operation of unloading the container from the ship, the truck moving towards the target parking space may have two possibilities: carrying a container and carrying no container. Correspondingly, the sets of point clouds obtained in these two cases are also different.

Therefore, in some embodiments, trucks of a plurality of different vehicle models that are parked at the target parking space and carrying containers can be scanned using the LiDAR in advance, to obtain a plurality of vehicle point cloud models and store them in a first model library. Trucks of the plurality of different vehicle models that are parked at the target parking space and carrying no container can be scanned using the LiDAR in advance, to obtain a plurality of vehicle point cloud models and store them in a second model library. The main controller can select the vehicle point cloud model matching the vehicle model of the truck to be parked from the model library as follows. When the main controller determines that the truck to be parked carries a container, it can select the vehicle point cloud model matching the vehicle model of the truck to be parked from the first model library. When the main controller determines that the truck to be parked carries no container, it can select the vehicle point cloud model matching the vehicle model of the truck to be parked from the second model library.

In order to ensure that all trucks arriving at shore cranes to perform operations of loading/unloading containers onto/from ships can find matching vehicle point cloud models for their respective sets of point clouds, in a specific implementation, the first model library and the second model library need to include vehicle point cloud models for all vehicle models of trucks performing operations of loading/unloading containers onto/from ships in the port. When a truck of a new vehicle model is added, the vehicle point cloud models in the first model library and the second model library also need to be updated accordingly.

In some embodiments, the vehicle controller can include the vehicle model of the truck to be parked in the parking request, and after receiving the parking request, the main controller can parse the vehicle model of the truck to be parked from the parking request.

In some embodiments, the main controller may first obtain a vehicle identification of the truck to be parked, and determine the vehicle model of the truck to be parked based on a known correspondence between vehicle identifications and vehicle models. Here, the vehicle identification can be a vehicle number.

In some embodiments, the main controller may obtain a vehicle identification of the truck to be parked by photographing and identifying a license plate of the truck to be parked. For example, the main controller can capture an image of the license plate of the truck to be parked using a camera.

In some embodiments, the vehicle controller can include the vehicle identification of the truck to be parked in the transmitted parking request, and after receiving the parking request, the main controller can parse the vehicle identification from the parking request.

In some embodiments, the parking request transmitted by the vehicle controller may contain information indicating whether the truck to be parked carries a container, and after receiving the parking request, the main controller can parse the information from the parking request, and determine whether the truck to be parked carries a container based on the information.

In some embodiments, the vehicle controller can determine whether the truck to be parked carries a container by detecting whether there is an object at a predetermined distance from a head of the truck to be parked in a horizontal direction above a load board, and generate the information indicating whether the truck to be parked carries a container based on a result of the detecting. For example, according to a shape of a body of the truck, a horizontal distance between a container and the head of the truck when the container is carried on the load board can be determined in advance. A laser rangefinder installed on the head of the truck can be configured to emit a horizontal laser beam towards the load board, and based on the time at which the reflected laser beam is received, it can be determined whether there is a container on the load board at the horizontal distance from the head of the truck to be parked.

The ICP algorithm can be used to calculate a rotation matrix and a translation matrix between the set of point clouds for the truck to be parked and the vehicle point cloud model in an iterative manner. Here, as all trucks move along the lane to the target parking space, the amount of rotation between the set of point clouds for the truck to be parked and the vehicle point cloud model can be negligible, i.e., the rotation matrix can be an identity matrix, and only the translation matrix needs to be calculated.

In some embodiments, in the step S400, the main controller can apply the ICP algorithm to the set of point clouds for the truck to be parked and the vehicle point cloud model to obtain the real-time distance between the truck to be parked and the target parking space as follows. The main controller can calculate a translation matrix from the set of point clouds for the truck to be parked to the vehicle point cloud model using the ICP algorithm, and then obtain the real-time distance from the truck to be parked to the target parking space based on the translation matrix.

In the iterative process of the ICP algorithm, an initial translation matrix to be used is a very important to the accuracy of the final calculation result. The embodiment of the present disclosure provides the following two schemes for determining the initial translation matrix.

(1) In some embodiments, a predetermined number of foremost points in a moving direction of the truck to be parked in the set of point clouds for the truck to be parked and the predetermined number of foremost points in the moving direction of the truck to be parked in the vehicle point cloud model are determined respectively. An average center of the predetermined number of foremost points in the moving direction of the truck to be parked in the set of point clouds for the truck to be parked is determined as a first average center. Here, coordinates of the first average center are average values of coordinates of the predetermined number of points in the set of point clouds for the truck to be parked. An average center of the predetermined number of foremost points in the moving direction of the truck to be parked in the vehicle point cloud model is determined as a second average center. Here, coordinates of the second average center are average values of coordinates of the predetermined number of points in the vehicle point cloud model. The matrix for translating the first average center to the second average center is determined as the initial translation matrix.

Figure 4:
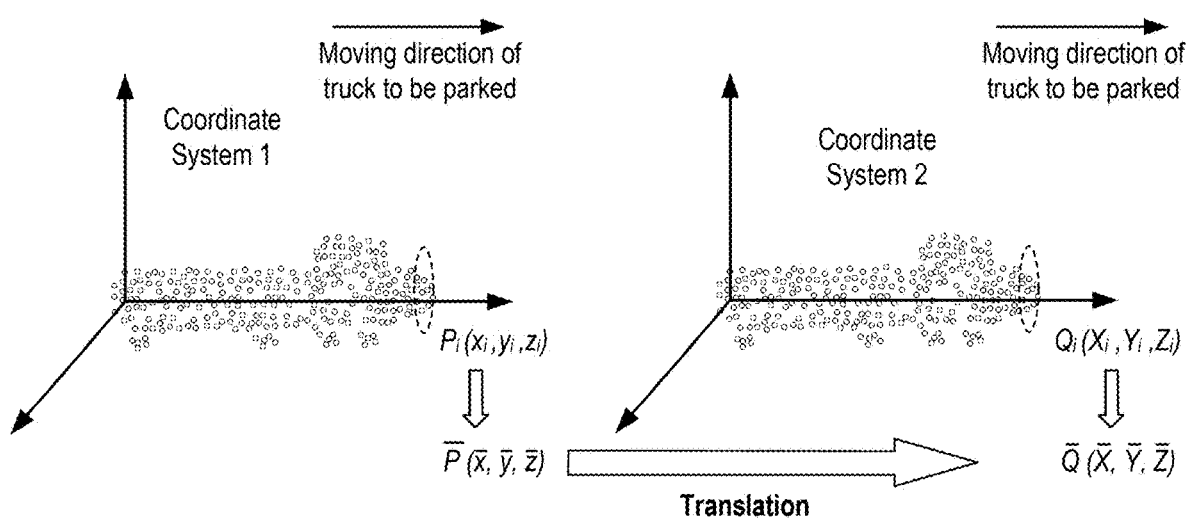
FIG. 4 schematically shows a process for determining an initial translation matrix according to an embodiment of the present disclosure.

As shown in FIG. 4, the set of point clouds for the truck to be parked is in Coordinate System 1, and the vehicle point cloud model is in Coordinate System 2. The n foremost points in the moving direction of the truck to be parked in the set of point clouds for the truck to be parked (identified by a dashed box) are $P_i(x_i, y_i, z_i)$ where i=1, 2, 3, ..., n. The first average center is $\overline{P}(\overline{x}, \overline{y}, \overline{z})$, where $$\overline{x} = \frac{\sum_{i=1}^{n} x_i}{n}, \overline{y} = \frac{\sum_{i=1}^{n} y_i}{n}, \text{ and } \overline{z} = \frac{\sum_{i=1}^{n} z_i}{n}.$$

The n foremost points in the moving direction of the truck to be parked in the vehicle point cloud model (identified by a dashed box) are $Q_i(X_i, Y_i, Z_i)$, where i=1, 2, 3, ..., n. The second average center is $\overline{Q}(\overline{X}, \overline{Y}, \overline{Z})$, where $$\overline{X} = \frac{\sum_{i=1}^{n} X_i}{n}, \overline{Y} = \frac{\sum_{i=1}^{n} Y_i}{n}, \text{ and } \overline{Z} = \frac{\sum_{i=1}^{n} Z_i}{n}.$$

The matrix for translating the first average center $\overline{P}(\overline{x}, \overline{y}, \overline{z})$ to the second average center $\overline{Q}(\overline{X}, \overline{Y}, \overline{Z})$ is determined as the initial translation matrix.

(2) In some embodiments, the vehicle controller may include the positioning data collected by the vehicle-mounted positioning device on the truck to be parked in the transmitted parking request, and the main controller can obtain the positioning data by parsing the parking request. When the main controller can apply the ICP algorithm to the set of point clouds for the truck to be parked and the vehicle point cloud model, an initial translation matrix can be a matrix for translating one or more points corresponding to the positioning data to one or more positioning points corresponding to the target parking space. Here, the one or more positioning points are one or more points corresponding to positioning data obtained by the vehicle-mounted positioning device when the truck stops at the target parking space in a process for determining the vehicle point cloud model.

In the process of determining the vehicle point cloud model, the truck used is provided with a vehicle-mounted positioning device. When the truck stops at the target parking space, one or more points determined based on the positioning data obtained by the vehicle-mounted positioning device on the truck are one or more points corresponding to the target parking space.

In this type of embodiment, the vehicle-mounted positioning device may be a GPS positioning device, an RTK positioning device, a Beidou satellite positioning system positioning device, a GLONASS positioning system positioning device, a Galileo positioning system positioning device, a Global Navigation Satellite System (GNSS) positioning device, a UWB positioning device, etc.

The vehicle point cloud model is a set of points for a truck that are accurately parked at the target parking space, and the set of point clouds for the truck to be parked as obtained by clustering is a set of points for the truck to be parked that is moving. Thus, by applying the ICP algorithm to the set of point clouds for the truck to be parked as obtained by clustering and the vehicle point cloud model, the real-time distance from the truck to be parked that is moving to the target parking space can be obtained. In this process, the accuracy of the vehicle point cloud model has a direct impact on the accuracy of the final calculation result. However, current commonly used LiDARs have a limited number of lines (such as 32 lines or 64 lines). When a LiDAR at a fixed-position is used to scan a truck parked at the target parking space, due to the limitation in the number of laser beams and the emission direction, the beams can only reach a small area of the vehicle body of the truck, and the obtained point cloud data can only reflect the small area of the vehicle body of the truck. The set of point clouds (i.e., the vehicle point cloud model) obtained by clustering cannot fully reflect the position of the entire vehicle body of the truck, or even the vehicle point cloud model cannot be obtained by using the clustering algorithm.

In order to overcome the above problem, in some embodiments, the vehicle point cloud model can be obtained according to steps S402 to S406.

At step S402, a truck that moves towards the target parking space and finally stops at the target parking space is scanned using the LiDAR in advance.

In some embodiments, the truck that moves towards the target parking space and finally stops at the target parking space refers to a truck that moves towards a predetermined parking marking line and stops in accordance with the parking marking line.

For example, the parking marking line may be a vertical line drawn on the door frame beam of the shore crane and provided for a front side plane or a rear side plane of the load board. The truck moves towards the parking marking line and stops when the front side plane or the rear side plane of its load board is on a same vertical plane as the parking marking line.

In some embodiments, the parking marking line may be a vertical line drawn on the door frame beam of the shore crane and provided for the rear side plane of the load board. The truck moves towards the parking marking line and stops when the rear side plane of its load board is on a same vertical plane as the parking marking line.

At step S404, point cloud data when the truck has not reached the target parking space is converted into a coordinate system for point cloud data when the truck reaches the target parking space.

In a specific implementation, this process can use the ICP algorithm to achieve the conversion of the point cloud data between different coordinate systems.

At step S406: a set of point clouds obtained after the converting is determined as the vehicle point cloud model.

In the steps S402~S406, the moving truck is scanned using the LiDAR. This can allow the laser beam to reach more areas of the vehicle body of the truck. Correspondingly, the obtained point cloud data can reflect more areas of the vehicle body of the truck. The obtained vehicle point cloud model can also reflect more areas of the vehicle body of the truck, thereby better reflecting the position of the entire body of the truck, such that the requirements of the ICP algorithm can be satisfied and the accuracy of the calculation result can be improved.

Since front ends and rear ends of the respective lanes crossed by the shore crane are in a same straight line, and the distance between the moving truck and the target parking space can be directly obtained based on the translation matrix between them, the target parking space in any of the lanes crossed by the shore crane can be selected to determine the vehicle point cloud model. The determined vehicle point cloud model can be used to calculate the distance from a truck moving in any of the lanes to the target parking space.

At step S500, the vehicle controller controls the truck to be parked to stop at the target parking space based on the real-time distance from the truck to be parked to the target parking space.

In order to ensure safe execution of operations of loading/unloading containers onto/from ships, the speed limit for the lanes crossed by the shore crane is generally set to be relatively low, such that the trucks can move in the lanes crossed by the shore crane at a relatively low speed. In view of this, in some embodiments, the step S500 can be performed as follows. When determining that the real-time distance from the truck to be parked to the target parking space is smaller than an unpowered coasting distance (that is, a distance that the truck can coast in an unpowered state) and a difference between them is smaller than or equal to a predetermined threshold, the vehicle controller can issue a throttle off signal to control the throttle of the truck to be parked to be off, such that the truck to be parked will coast to and stop at the target parking space.

In a specific implementation, the predetermined threshold can be set to a value close to 0, and the real-time distance from the truck to be parked to the target parking space being smaller than the unpowered coasting distance and the difference between them being smaller than or equal to the predetermined threshold may mean that the real-time distance from the truck to be parked to the target parking space is very close to the unpowered coasting distance. At this time, the vehicle controller issues a throttle off signal, and the truck to be parked coasts to and stops at the target parking space in an unpowered state.

The unpowered coasting distance of the vehicle depends a speed, weight, and tire performance of the vehicle, a road friction coefficient, etc. Here, data such as the speed, weight, and tire performance can be collected from a central control system of the truck to be parked, and the road friction coefficient can be pre-configured in the vehicle controller. After the vehicle controller obtains the data, it can calculate the unpowered coasting distance of the truck to be parked.

The above implementation in which the truck to be parked coasts to and stops at the target parking space in the unpowered state imposes higher requirements on the accuracy of the unpowered coasting distance. Once the unpowered coasting distance calculated by the vehicle controller is inaccurate, it is very likely that the truck to be parked cannot coast to and stop at the target parking space. In view of this, in order to further ensure that the truck to be parked can stop accurately at the target parking space, in some embodiments, the step S500 may also be performed as follows. The vehicle controller can issue a throttle off signal to control the throttle of the truck to be parked to be off when determining that the real-time distance from the truck to be parked to the target parking space is smaller than an unpowered coasting distance and a difference between them is smaller than or equal to a predetermined threshold, and issue a braking signal to control the truck to be parked to brake and stop at the target parking space when the real-time distance from the truck to be parked to the target parking space is smaller than a predetermining braking distance and a speed of the truck to be parked is greater than a predetermined speed.

In this embodiment, after issuing a throttle off signal to cause the truck to be parked to coast in the unpowered state, the vehicle controller can issue a braking signal to control the truck to be parked to brake and stop at the target parking space when the real-time distance from the truck to be parked to the target parking space is smaller than the predetermining braking distance and the speed of the truck to be parked is greater than the predetermined speed.

Here, the predetermined braking distance, the predetermined speed, and the braking signal have the following relationship. With the effect of the braking signal, the distance traveled by the truck to be parked while the speed of the truck to be parked drops from the predetermined speed to zero equals exactly to the predetermined braking distance.

Since the braking distance of the vehicle depends on a braking force of the vehicle, a speed at the time of braking, a weight, and tire performance of the vehicle, and the braking force is directly dependent on the braking signal, the vehicle controller can calculate the predetermined braking distance, the predetermined speed and the braking signal of the vehicle based on historical braking data (e.g., braking speeds and braking distances in previous braking processes) of the vehicle and the data such as speed, weight and tire performance as collected from a central control system of the vehicle.

EXAMPLE 1

Figure 5:
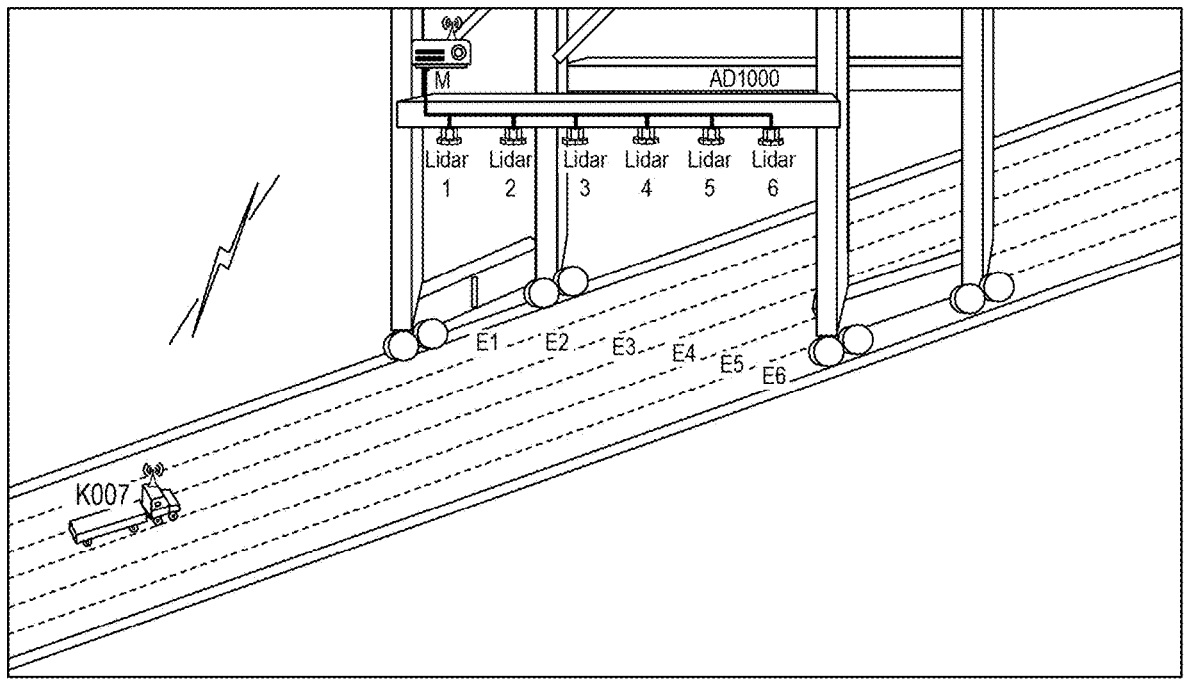
FIG. 5 schematically shows a truck accurately parked in a shore crane area when performing a task of unloading a container from a ship according to an embodiment of the present disclosure.

As shown in FIG. 5, a shore crane numbered AD1000 crosses six lanes numbered E1~E6, respectively. Six LiDARs, numbered Lidar1~Lidar6 respectively, are provided at the bottom of a connecting beam of the shore crane for scanning E1~E6, respectively. That is, each LiDAR is responsible for scanning one lane. A main controller M is connected to the LiDARs Lidar1~Lidar6, and is responsible for tasks of accurately parking trucks in the respective lanes under the shore crane AD1000.

The main controller M stores the following information locally:

(1) lidar numbers Lidar1~Lidar6;
(2) shore crane number AD1000;
(3) lane numbers E1~E6; and
(4) a first model library and a second model library (vehicle point cloud models in the first model library correspond to trucks carrying containers, vehicle point cloud models in the second model library correspond to trucks carrying no container, and vehicle models of trucks corresponding to the vehicle point cloud models include SQ01~SQ09 and BQ01~BQ09).

A truck to be parked, numbered K007, receives a command for a task of unloading a container from a ship, instructing the truck to be parked K007 to move to the shore crane AD1000 at a position with a latitude and a longitude of (Lon1, Lat1) to load a container JZX2019. After receiving the command, the truck to be parked K007 moves to the shore crane AD1000 using a vehicle-mounted navigation device. A vehicle controller acquires positioning data (Lon2, Lat2) obtained by a vehicle-mounted GPS positioning device on the truck to be parked K007 in real time, and determines a distance between the truck to be parked K007 and the shore crane AD1000 by comparing the real-time positioning data (Lon2, Lat2) of the truck to be parked with the position (Lon1, Lat1). When determining that the distance between them is smaller than 50 meters, the vehicle controller broadcasts a parking request via a vehicle-mounted V2X device. The parking request contains the following information:

(1) vehicle number K007;
(2) shore crane number AD1000;
(3) vehicle model SQ07;
(4) real-time positioning data (Lon2, Lat2); and
(5) information indicating that no container is carried (the information can be generated as follows: a laser rangefinder installed on the head of the truck to be parked can be configured to emit a horizontal laser beam towards a load board, and based on time at which the reflected laser beam is received, it can be determined whether there is a container on the load board, and the information can be generated based on the determination result).

After receiving the parking request via a V2X device, the main controller M parses the parking request to obtain the shore crane number AD1000, and compares it with a shore crane number stored locally at the main controller M to determine that the truck to be parked needs to be accurately parked under the shore crane AD1000 the main controller M is responsible for. Accordingly, the main controller M returns a confirmation message and establishes a communication connection with the vehicle controller of the truck to be parked K007.

The main controller M further parses the parking request to obtain the real-time positioning data (Lon2, Lat2). The main controller M acquires real-time point cloud data obtained by scanning using each of the LiDARs Lidar1~Lidar6 connected to it, cluster the real-time point cloud data to obtain sets of point clouds for a plurality of truck, and determine, from the sets of point clouds, a set of point clouds containing the real-time positioning data (Lon2, Lat2), as a set of point clouds for the truck to be parked K007.

The main controller M further parses the parking request to obtain the vehicle model SQ07 and the information indicating that no container is carried. Therefore, the main controller M retrieves the vehicle point cloud model K1-K2-MX-SQ07 corresponding to the vehicle model SQ07 from the second model library.

The main controller M applies an ICP algorithm to the set of point clouds for the truck to be parked K007 and the vehicle point cloud model K1-K2-MX-SQ07 to obtain a distance from the truck to be parked K007 and the target parking space, and transmits it to the vehicle controller. Here, a rotation matrix used in the iterative calculation of the ICP algorithm is an identity matrix, and an initial translation matrix used in the iterative calculation of the ICP algorithm is a matrix for translating an average center of the N closest points to the target parking space in the set of point clouds for the truck to be parked to an average center of the N closest points to the target parking space in the vehicle point cloud model K1-K2-MX-SQ07.

When the truck to be parked K007 is moving, the vehicle controller continuously transmits the parking request at a first predetermined frequency. The main controller M continuously acquires the real-time point cloud data obtained by scanning using the LiDAR at a second predetermined frequency, clusters the real-time point cloud data to obtain the set of point clouds for the truck to be parked K007, applies the ICP algorithm to the set of point clouds for the truck to be parked K007 and the vehicle point cloud model K1-K2-MX-SQ07 at the second predetermined frequency to obtain a real-time distance from the truck to be parked K007 to the target parking space, and finally transmits the obtained real-time distance to the vehicle controller.

Each time the vehicle controller receives the real-time distance from the main controller M, it determines whether the speed of the truck to be parked K007 needs to be adjusted based on the real-time distance, so as to control the truck to be parked K007 to stop accurately at the target parking space.

The shore crane AD1000 loads the container JZX2019 onto the load board of the truck to be parked K007 to complete the task of unloading the container from the ship.

EXAMPLE 2

Figure 6:
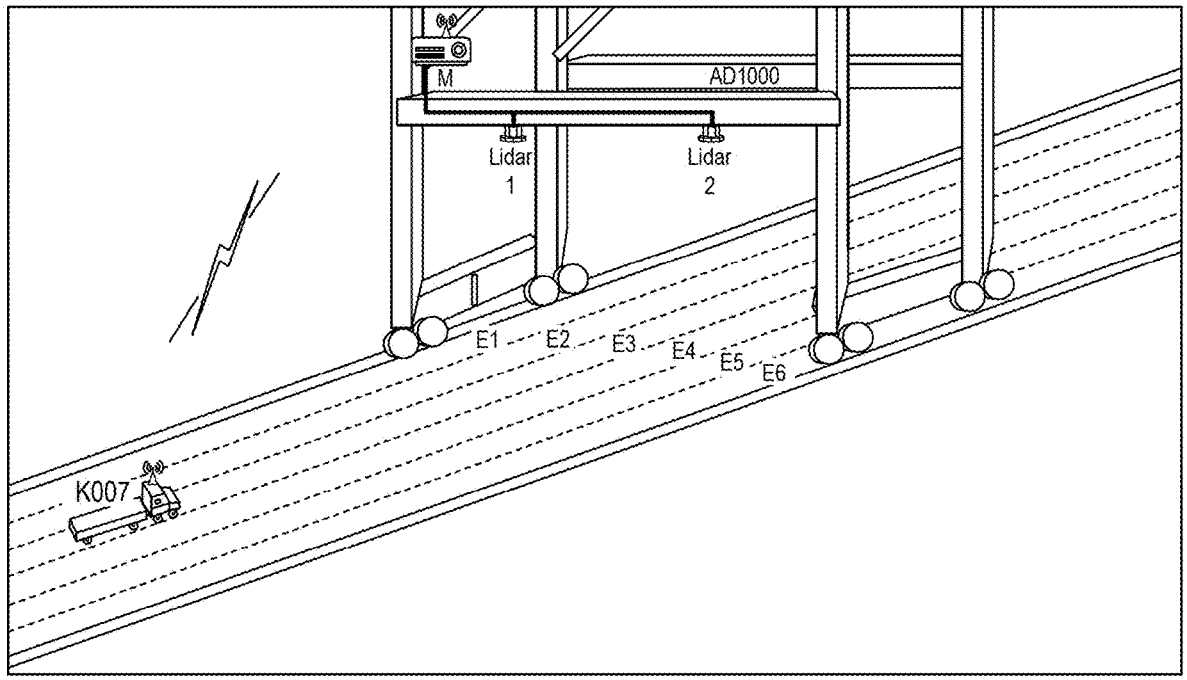
FIG. 6 schematically shows a truck accurately parked in a shore crane area when performing a task of unloading a container from a ship according to an embodiment of the present disclosure.

As shown in FIG. 6, a shore crane numbered AD1000 crosses six lanes numbered E1~E6, respectively. Two LiDARs, numbered Lidar1 and Lidar2 respectively, are provided at the bottom of a connecting beam of the shore crane. Lidar1 is responsible for scanning the lanes E1~E3, and Lidar2 is responsible for scanning the lanes E4~E6. That is, each LiDAR is responsible for scanning three lanes. A main controller M is connected to the LiDARs Lidar1 and Lidar2, and is responsible for tasks of accurately parking trucks in the respective lanes under the shore crane AD1000.

The main controller M stores the following information locally:

(1) lidar numbers Lidar1 and Lidar2;
(2) shore crane number AD1000;
(3) lane numbers E1~E6; and
(4) a first model library and a second model library (vehicle point cloud models in the first model library correspond to trucks carrying containers, vehicle point cloud models in the second model library correspond to trucks carrying no container, and vehicle models of trucks corresponding to the vehicle point cloud models include SQ01~SQ09 and BQ01~BQ09).

A truck to be parked, numbered K007, receives a command for a task of loading a container onto a ship, instructing the truck to be parked K007 to move to the shore crane AD1000 at a position with a latitude and a longitude of (Lon1, Lat1) to load a container JZX2019. After receiving the command, the truck to be parked K007 moves to the shore crane AD1000 using a vehicle-mounted navigation device. A vehicle controller acquires positioning data (Lon2, Lat2) obtained by a vehicle-mounted GPS positioning device on the truck to be parked K007 in real time, and determines a distance between the truck to be parked K007 and the shore crane AD1000 by comparing the real-time positioning data (Lon2, Lat2) of the truck to be parked with the position (Lon1, Lat1). When determining that the distance between them is smaller than 50 meters, the vehicle controller broadcasts a parking request via a vehicle-mounted V2X device. The parking request contains the following information:

(1) vehicle number K007;
(2) shore crane number AD1000;
(3) lane number E4;
(4) real-time positioning data (Lon2, Lat2); and (5) information indicating that a container is carried.

After receiving the parking request via a V2X device, the main controller M parses the parking request to obtain the shore crane number AD1000, and compares it with a shore crane number stored locally at the main controller M to determine that the truck to be parked needs to be accurately parked under the shore crane AD1000 the main controller M is responsible for. Accordingly, the main controller M returns a confirmation message and establishes a communication connection with the vehicle controller of the truck to be parked K007.

The main controller M further parses the parking request to obtain the lane number E4. According to the relative position between the lane E4 and the LiDAR Lidar2, the main controller extracts point cloud data of the lane E4 from the real-time point cloud data, clusters the point cloud data of the lane E4 to obtain the set of point clouds for the truck to be parked K007 (as the distance between adjacent trucks moving in the same lane is required to be greater than the scanning range of the LiDAR, there is a set of point clouds for at most one truck in the point cloud data of one lane).

The main controller M parses the parking request to obtain the vehicle number K007. According to a correspondence between vehicle numbers and vehicle models, the vehicle model of the truck to be parked K007 is determined to be SQ07.

The main controller M further parses the parking request to obtain the information indicating that a container is carried. Therefore, the main controller M retrieves the vehicle point cloud model K1-MX-SQ07 corresponding to the vehicle model SQ07 from the first model library.

The main controller M applies an ICP algorithm to the set of point clouds for the truck to be parked K007 and the vehicle point cloud model K1-MX-SQ07 to obtain a distance from the truck to be parked K007 to the target parking space, and transmits it to the vehicle controller. Here, a rotation matrix used in the iterative calculation of the ICP algorithm is an identity matrix, and an initial translation matrix used in the iterative calculation of the ICP algorithm is a matrix for translating a point corresponding to the real-time positioning data (Lon2, Lat2) to a positioning point (Lon3, Lat3) of the target parking space. The positioning point (Lon3, Lat3) of the target parking space is a point corresponding to positioning data obtained by a vehicle-mounted positioning device on a truck of the model SQ07 when the truck stops at the target parking space in the process of determining the vehicle point cloud model K1-MX-SQ07.

When the truck to be parked K007 is moving, the vehicle controller continuously transmits the parking request at a first predetermined frequency. The main controller M continuously acquires the real-time point cloud data obtained by scanning using the LiDAR Lidar2 at a second predetermined frequency, clusters the real-time point cloud data to obtain the set of point clouds for the truck to be parked K007, applies the ICP algorithm to the set of point clouds for the truck to be parked K007 and the vehicle point cloud model K1-MX-SQ07 at the second predetermined frequency to obtain a real-time distance from the truck to be parked K007 to the target parking space, and finally transmits the obtained real-time distance to the vehicle controller.

Each time the vehicle controller receives the real-time distance from the main controller M, it determines whether the speed of the truck to be parked K007 needs to be adjusted based on the real-time distance, so as to control the truck to be parked K007 to stop accurately at the target parking space.

The shore crane AD1000 lifts the container JZX2019 from the load board of the truck to be parked K007 to the ship to complete the task of loading the container to the ship.

Figure 7:
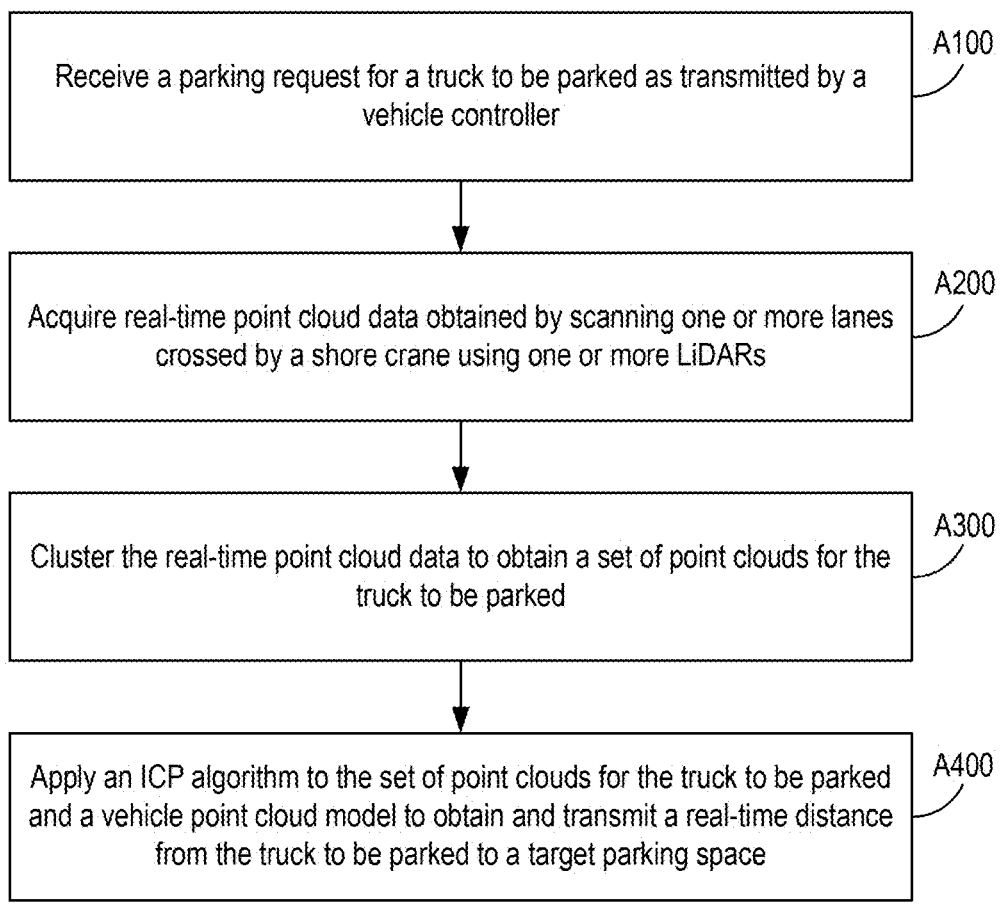
FIG. 7 schematically shows a flow of a method applied in a main controller for parking a truck accurately in a shore crane area according to an embodiment of the present disclosure.

Based on the same inventive concept, an embodiment of the present disclosure provides a method applied in a main controller for parking a truck accurately in a shore crane area. As shown in FIG. 7, the method includes the following steps.

At step A100, a parking request for a truck to be parked as transmitted by a vehicle controller is received.

At step A200, real-time point cloud data obtained by scanning one or more lanes crossed by a shore crane using one or more LiDARs is acquired.

At step A300, the real-time point cloud data is clustered to obtain a set of point clouds for the truck to be parked.

At step A400, an ICP algorithm is applied to the set of point clouds for the truck to be parked and a vehicle point cloud model to obtain and transmit a real-time distance from the truck to be parked to a target parking space, such that the vehicle controller controls the truck to be parked to stop at the target parking space based on the real-time distance. Here, the vehicle point cloud model is a set of point clouds obtained by scanning a truck parked at the target parking space using a LiDAR in advance.

In some embodiments, the operation of applying the ICP algorithm to the set of point clouds for the truck to be parked and the vehicle point cloud model may include: determining a vehicle model of the truck to be parked; selecting the vehicle point cloud model matching the vehicle model of the truck to be parked from a model library; and applying the ICP algorithm to the set of point clouds for the truck to be parked and the vehicle point cloud model matching the vehicle model of the truck to be parked. The model library includes a plurality of vehicle point cloud models obtained by scanning trucks of a plurality of different vehicle models that are parked at the target parking space using the LiDAR in advance.

In some embodiments, the operation of selecting the vehicle point cloud model matching the vehicle model of the truck to be parked from the model library may include: selecting, when determining that the truck to be parked carries a container, the vehicle point cloud model matching the vehicle model of the truck to be parked from a first model library, the first model library including a plurality of vehicle point cloud models obtained by scanning trucks of the plurality of different vehicle models that are parked at the target parking space and carrying containers using the LiDAR in advance; and selecting, when determining that the truck to be parked carries no container, the vehicle point cloud model matching the vehicle model of the truck to be parked from a second model library, the second model library including a plurality of vehicle point cloud models obtained by scanning trucks of the plurality of different vehicle models that are parked at the target parking space and carrying no container using the LiDAR in advance.

In some embodiments, the operation of determining the vehicle model of the truck to be parked may include: parsing a vehicle identification of the truck to be parked from the parking request, and determining the vehicle model of the truck to be parked based on a known correspondence between vehicle identifications and vehicle models.

In some embodiments, the operation of determining the vehicle model of the truck to be parked may include: parsing the vehicle model of the truck to be parked from the parking request.

In some embodiments, the operation of applying the ICP algorithm to the set of point clouds for the truck to be parked and the vehicle point cloud model to obtain the real-time distance from the truck to be parked to the target parking space may include: calculating a translation matrix from the set of point clouds for the truck to be parked to the vehicle point cloud model using the ICP algorithm; and obtaining the real-time distance from the truck to be parked to the target parking space based on the translation matrix.

In some embodiments, the operation of calculating the translation matrix from the set of point clouds for the truck to be parked to the vehicle point cloud model using the ICP algorithm may include: determining an initial translation matrix, the initial translation matrix being a matrix for translating an average center of a predetermined number of foremost points in a moving direction of the truck to be parked in the set of point clouds for the truck to be parked to an average center of the predetermined number of foremost points in the moving direction of the truck to be parked in the vehicle point cloud model, coordinates of the average center being average values of coordinates of the predetermined number of points; and performing iterative calculation on the set of point clouds for the truck to be parked and the vehicle point cloud model based on the initial translation matrix, to obtain the translation matrix from the set of point clouds for the truck to be parked to the vehicle point cloud model.

In some embodiments, the operation of calculating the translation matrix from the set of point clouds for the truck to be parked to the vehicle point cloud model using the ICP algorithm may include: parsing positioning data collected by a vehicle-mounted positioning device on the truck to be parked from the parking request; determining an initial translation matrix, the initial translation matrix being a matrix for translating one or more points corresponding to the positioning data to one or more positioning points corresponding to the target parking space, the one or more positioning points being one or more points corresponding to positioning data obtained by the vehicle-mounted positioning device when the truck stops at the target parking space in a process for determining the vehicle point cloud model; and performing iterative calculation on the set of point clouds for the truck to be parked and the vehicle point cloud model based on the initial translation matrix, to obtain the translation matrix from the set of point clouds for the truck to be parked to the vehicle point cloud model.

In some embodiment, it may be determined whether the truck to be parked carries a container by: parsing, from the parking request, information indicating whether the truck to be parked carries a container, and determining whether the truck to be parked carries a container based on the information.

In some embodiments, the operation of receiving the parking request may include: receiving the parking request and parsing a shore crane identification from the parking request, matching the shore crane identification with a shore crane corresponding to itself, and establishing a communication connection with the vehicle controller when the shore crane identification matches the shore crane.

In some embodiments, the parking request may be received via a V2X device.

In some embodiments, the vehicle point cloud model may be determined by: scanning a truck that moves towards the target parking space and finally stops at the target parking space using the LiDAR in advance; converting point cloud data when the truck has not reached the target parking space into a coordinate system for point cloud data when the truck reaches the target parking space; and determining a set of point clouds obtained after the converting as the vehicle point cloud model.

In some embodiments, the operation of scanning the truck that moves towards the target parking space and finally stops at the target parking space using the LiDAR in advance may include: scanning the truck that moves towards a predetermined parking marking line and stops in accordance with the parking marking line.

In some embodiments, said stopping in accordance with the parking marking line may include: stopping when a rear side plane of a load board of the truck is on a same vertical plane as the parking marking line.

In some embodiments, the operation of clustering the real-time point cloud data to obtain the set of point clouds for the truck to be parked may include: parsing positioning data collected by a vehicle-mounted positioning device on the truck to be parked from the parking request; and clustering the real-time point cloud data to obtain one or more sets of point clouds for one or more trucks, and determining, from the one or more sets of point clouds for the one or more trucks, a set of point clouds containing the positioning data, as the set of point clouds for the truck to be parked.

In some embodiments, the operation of clustering the real-time point cloud data to obtain the set of point clouds for the truck to be parked may include: parsing positioning data collected by a vehicle-mounted positioning device on the truck to be parked from the parking request; and extracting, from the real-time point cloud data, point cloud data corresponding to a position corresponding to the positioning data and an area within a predetermined length around the position, and clustering the extracted point cloud data to obtain the set of point clouds for the truck to be parked.

In some embodiments, the operation of clustering the real-time point cloud data to obtain the set of point clouds for the truck to be parked may include: parsing a number of a lane where the truck to be parked is located from the parking request; extracting, from the real-time point cloud data, point cloud data of the lane where the truck to be parked is located based on the number of the lane where the truck to be parked is located and a known position of each lane crossed by the shore crane relative to the one or more LiDARs; clustering the real-time point cloud data to obtain one or more sets of point clouds for one or more trucks; and determining, from the one or more sets of point clouds for the one or more trucks, a set of point clouds having an intersection with the point cloud data of the lane where the truck to be parked is located, as the set of point clouds for the truck to be parked.

In some embodiments, the operation of clustering the real-time point cloud data to obtain the set of point clouds for the truck to be parked may include: parsing a number of a lane where the truck to be parked is located from the parking request; extracting, from the real-time point cloud data, point cloud data of the lane where the truck to be parked is located based on the number of the lane where the truck to be parked is located and a known position of each lane crossed by the shore crane relative to the one or more LiDARs, and clustering the extracted point cloud data to obtain the set of point clouds for the truck to be parked.

In some embodiments, the operation of acquiring the real-time point cloud data obtained by scanning the one or more lanes crossed by the shore crane using the one or more LiDARs may include: parsing a number of a lane where the truck to be parked is located from the parking request; and determining a LiDAR configured to scan the lane based on the number of the lane where the truck to be parked is located, and acquiring the real-time point cloud data obtained by scanning using the LiDAR.

In some embodiments, each LiDAR is configured to scan only one lane crossed by the shore crane, and each main controller is configured to acquire the real-time point cloud data obtained by scanning using only one LiDAR.

In some embodiments, each LiDAR is configured to scan at least two lanes crossed by the shore crane, and each main controller is configured to acquire the real-time point cloud data obtained by scanning using only one LiDAR.

In some embodiments, each LiDAR is configured to scan only one lane crossed by the shore crane, and each main controller is configured to acquire the real-time point cloud data obtained by scanning using at least two LiDARs.

In some embodiments, each LiDAR is configured to scan at least two lanes crossed by the shore crane, and each main controller is configured to acquire the real-time point cloud data obtained by scanning using at least two LiDARs.

The method applied to a main controller for parking a truck accurately in a shore crane area as shown in FIG. 7 is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Figure 8:
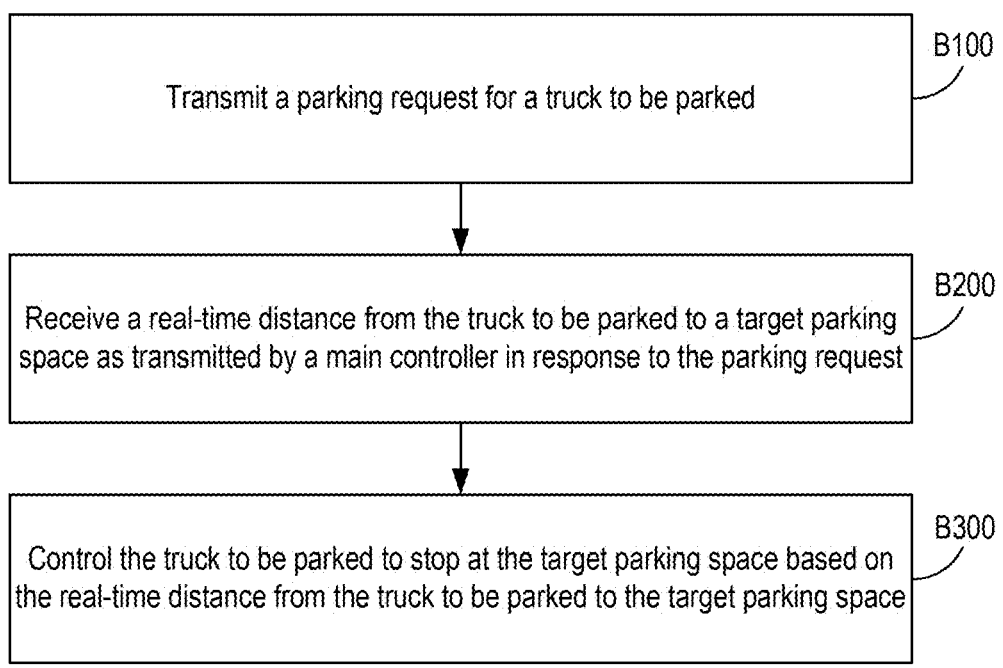
FIG. 8 schematically shows a flow of a method applied in a vehicle controller for parking a truck accurately in a shore crane area according to an embodiment of the present disclosure.

Based on the same inventive concept, the present disclosure also provides a method applied in a vehicle controller for parking a truck accurately in a shore crane area. As shown in FIG. 8, the method includes the following steps.

At step B100, a parking request for a truck to be parked is transmitted.

At step B200, a real-time distance from the truck to be parked to a target parking space as transmitted by a main controller in response to the parking request is received.

At step B300, the truck to be parked is controlled to stop at the target parking space based on the real-time distance from the truck to be parked to the target parking space.

Here, the real-time distance from the truck to be parked to the target parking space is calculated by the main controller by: receiving the parking request for the truck to be parked as transmitted by a vehicle controller; acquiring real-time point cloud data obtained by scanning one or more lanes crossed by a shore crane using one or more LiDARs; clustering the real-time point cloud data to obtain a set of point clouds for the truck to be parked; and applying an ICP algorithm to the set of point clouds for the truck to be parked and a vehicle point cloud model to obtain and transmit the real-time distance from the truck to be parked to the target parking space. The vehicle point cloud model is a set of point clouds obtained by scanning a truck parked at the target parking space using a LiDAR in advance.

In some embodiments, the operation of transmitting the parking request for the truck to be parked may include transmitting the parking request for the truck to be parked containing one or more of: a vehicle identification of the truck to be parked, a vehicle model of the truck to be parked, positioning data collected by a vehicle-mounted positioning device on the truck to be parked, a number of a lane where the truck to be parked is located, information indicating whether the truck to be parked carries a container, and a shore crane identification.

In some embodiments, the method may further include: determining whether the truck to be parked carries a container by detecting whether there is an object at a predetermined distance from a head of the truck to be parked in a horizontal direction above a load board; and generating the information indicating whether the truck to be parked carries a container based on a result of the detecting.

In some embodiments, the method may further include: receiving an operation command for loading/unloading a container onto/from a ship; parsing the shore crane identification from the operation command for loading/unloading the container onto/from the ship; and controlling the truck to be parked to move to the shore crane corresponding to the shore crane identification.

In some embodiments, the operation of transmitting the parking request for the truck to be parked may include: broadcasting the parking request for the truck to be parked via a Vehicle to Everything (V2X) device.

In some embodiments, the operation of transmitting the parking request for the truck to be parked may include: transmitting the parking request when determining that a distance between the truck to be parked and the shore crane is smaller than or equal to a predetermined distance, or when the shore crane is detected.

In some embodiments, the operation of controlling the truck to be parked to stop at the target parking space may include: controlling the truck to be parked to stop at the target parking space by controlling a throttle control system and a brake system of the truck to be parked.

The method applied to a vehicle controller for parking a truck accurately in a shore crane area as shown in FIG. 8 is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Based on the same inventive concept, an embodiment of the present disclosure also provides a computer readable storage medium having a computer program stored thereon. The computer program, when executed by a processor, implements the steps in the method applied in a main controller for parking a truck accurately in a shore crane area. The computer readable storage medium may be, for example, but not limited to, an electrical, magnetic, optical, electromagnetic, infrared, or semiconductor system, apparatus, or device, or any combination thereof. In some embodiments, the computer readable storage medium may be an electrical connection with one or more wires, a portable disk, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination thereof.

Based on the same inventive concept, an embodiment of the present disclosure also provides a computer readable storage medium having a computer program stored thereon. The computer program, when executed by a processor, implements the steps in the method applied in a vehicle controller for parking a truck accurately in a shore crane area. The computer readable storage medium may be, for example, but not limited to, an electrical, magnetic, optical, electromagnetic, infrared, or semiconductor system, apparatus, or device, or any combination thereof. In some embodiments, the computer readable storage medium may be an electrical connection with one or more wires, a portable disk, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination thereof.

Exemplary Devices

Based on the same inventive concept, an embodiment of the present disclosure also provides a main controller. The main controller includes a first processor, a first memory, and a computer program stored on the first memory and executable on the first processor. The first processor is configured to, when executing the computer program, perform the method applied in a main controller for parking a truck accurately in a shore crane area as shown in FIG. 7.

The method performed by executing the computer program in the first memory is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Optionally, in the present disclosure, the first processor may be implemented as a circuit, a chip or any other electronic component. For example, the first processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the first memory may be implemented as a circuit, a chip or any other electronic component. For example, the first memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

In an embodiment of the present disclosure, the main controller may be a computer device in the form of an industrial computer, a server, a PC, a portable computer, a tablet computer, a PDA, or an iMac.

Based on the same inventive concept, an embodiment of the present disclosure also provides a vehicle controller. The vehicle controller includes a second processor, a second memory, and a computer program stored on the second memory and executable on the second processor. The second processor is configured to, when executing the computer program, perform the method applied in a vehicle controller for parking a truck accurately in a shore crane area as shown in FIG. 8.

The method performed by executing the computer program in the second memory is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Optionally, in the present disclosure, the second processor may be implemented as a circuit, a chip or any other electronic component. For example, the second processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the second memory may be implemented as a circuit, a chip or any other electronic component. For example, the second memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

In an embodiment of the present disclosure, the vehicle controller may be a Digital Signal Processing (DSP), a Field-Programmable Gate Array (FPGA) controller, an industrial computer, a vehicle-mounted computer, an Electronic Control Unit (ECU), ARM, or a Vehicle Control Unit (VCU), etc. The present disclosure is not limited to any of these examples.

Figure 9:
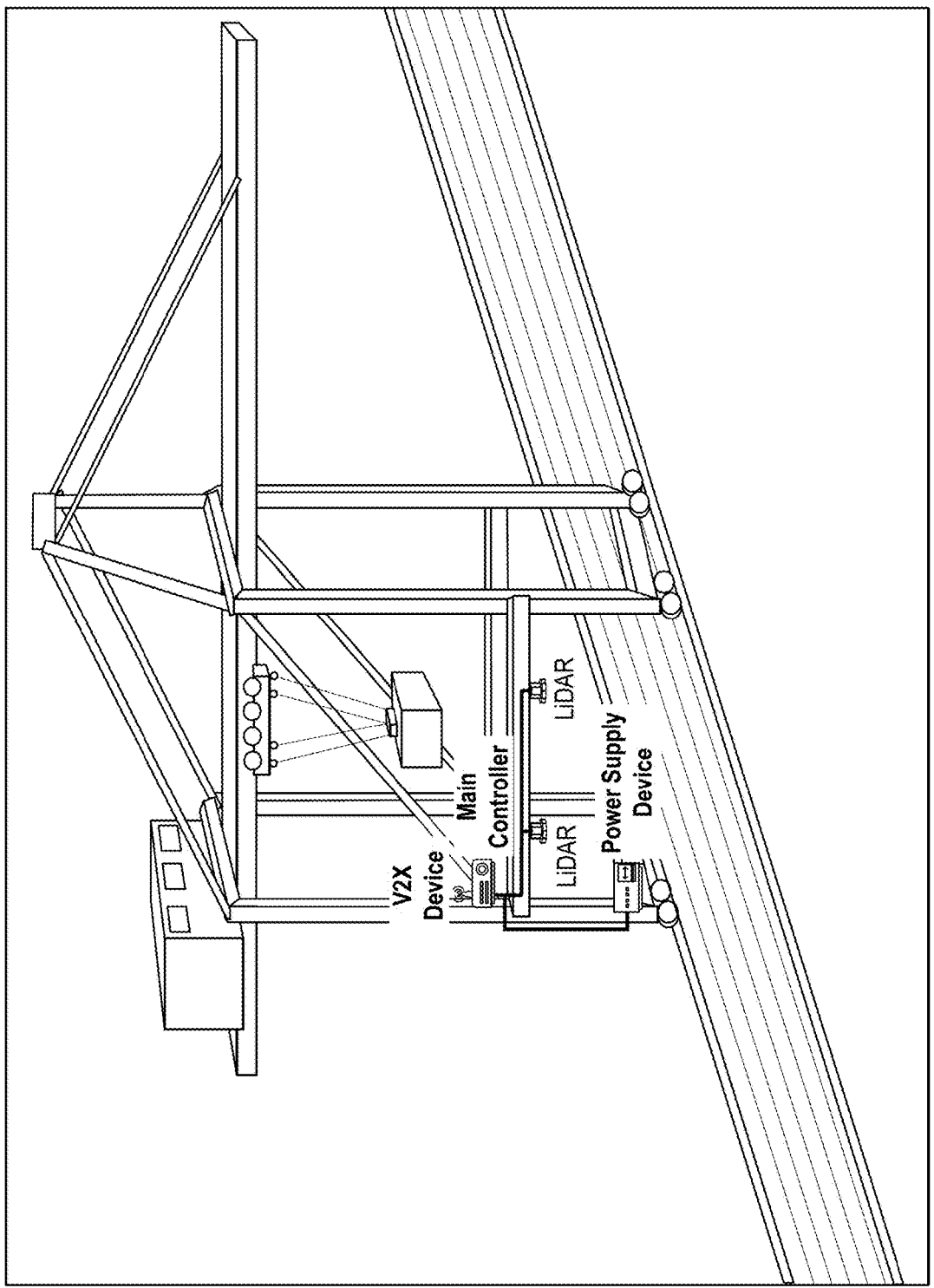
FIG. 9 schematically shows a shore crane according to an embodiment of the present disclosure.

Based on the same inventive concept, an embodiment of the present disclosure also provides a shore crane. As shown in FIG. 9, the shore crane is provided with one or more LiDARs and a main controller.

Here, the one or more LiDARs and the main controller can be provide on a bridge frame, a sea side door frame, a land side door frame, a door frame beam, or a connecting beam of the shore crane. The one or more LiDARs are configured to scan one or more lanes crossed by the shore crane. The main controller is configured to acquire real-time point cloud data obtained by scanning the one or more lanes using the one or more LiDARs, cluster the acquired real-time point cloud data to obtain a set of point clouds for the truck to be parked, and apply an ICP algorithm to the set of point clouds for the truck to be parked and a vehicle point cloud model to obtain and transmit a real-time distance from the truck to be parked to a target parking space, such that the truck to be parked can stop accurately at the target parking space.

In some embodiments, the shore crane may be further provided with a Vehicle to Everything (V2X) device connected to the main controller.

In some embodiments, the shore crane may be further provided with a power supply device configured to supply power to the main controller and/or the one or more LiDARs.

In some embodiments, the power supply device may be configured to obtain power from a power supply system of the shore crane.

In some embodiments, in order to deal with an emergency such as a sudden power failure of the power supply system of the shore crane that causes the power supply device to be unable to supply power, the shore crane may be further provided with an Uninterruptible Power Supply (UPS) configured to supply power to the main controller and/or the one or more LiDARs when the power supply device is off.

Figure 10:
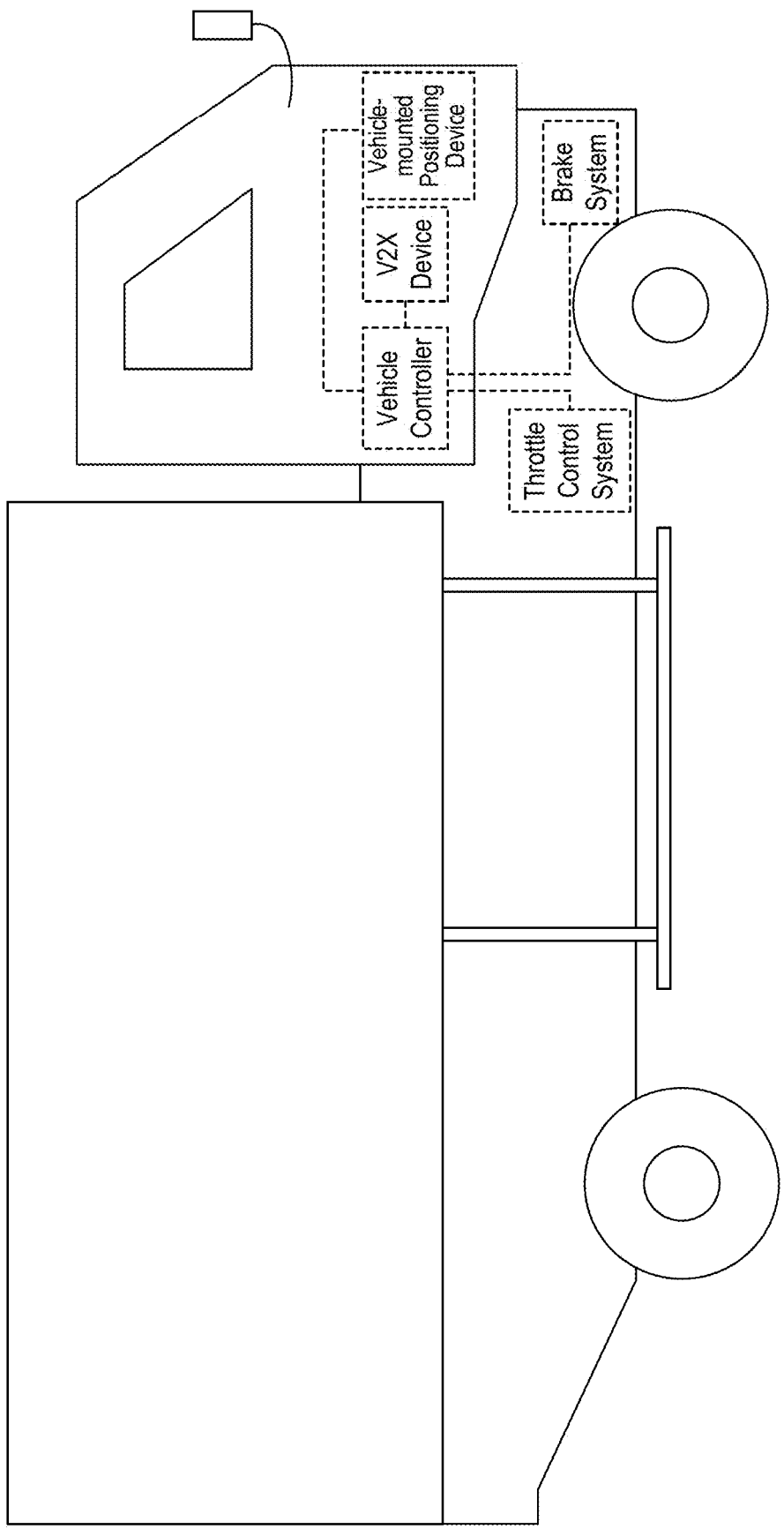
FIG. 10 schematically shows a vehicle according to an embodiment of the present disclosure.

Based on the same inventive concept, an embodiment of the present disclosure also provides a vehicle. As shown in FIG. 10, the vehicle is provided with a vehicle controller. Here, the vehicle controller is configured to transmit a parking request for a truck to be parked; receive a real-time distance from the truck to be parked to a target parking space as transmitted by a main controller in response to the parking request; and control the truck to be parked to stop at the target parking space based on the real-time distance from the truck to be parked to the target parking space.

In some embodiments, the vehicle controller may be connected to a throttle control system and a brake system of the vehicle. That is, the vehicle controller indirectly achieves the purpose of controlling the truck to be parked to stop at the target parking space by controlling the throttle control system and the brake system of the vehicle.

In some embodiments, the vehicle may be further provided with a Vehicle to Everything (V2X) device connected to the vehicle controller.

In some embodiments, the vehicle may be further provided with a vehicle-mounted positioning device configured to obtain positioning data.

The vehicle can be a legacy vehicle driven by a human, such as a passenger car, a truck, an engineering vehicle, a fire engine, an ambulance, or a truck, or can be an autonomous vehicle. The vehicle can be a vehicle consuming traditional energy such as gasoline or diesel, or a vehicle consuming new energy such as electrical energy or solar energy. Here, the autonomous vehicle refers to any vehicle using the autonomous driving technology to carry people (such as passenger cars, buses, etc.) or goods (such as ordinary trucks, vans, closed trucks, tank trucks, flatbed trucks, container trucks, dump trucks, trucks with special structures, etc.) or provide special rescue functions (such as fire trucks, ambulances, etc.).

Exemplary System

Figure 11:
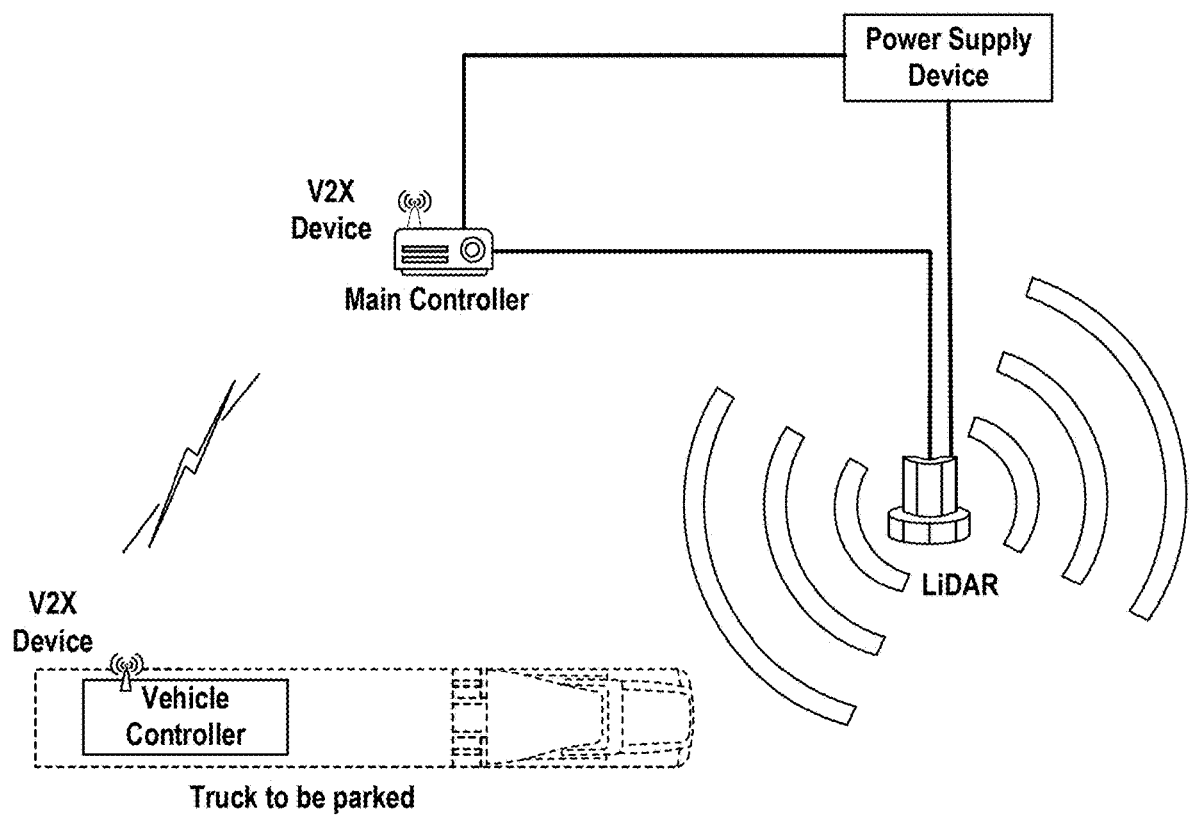
FIG. 11 schematically shows a system for parking a truck accurately in a shore crane area according to an embodiment of the present disclosure.

Based on the same inventive concept, an embodiment of the present disclosure also provides a system for parking a truck accurately in a shore crane area. As shown in FIG. 11, the system includes a main controller, a vehicle controller, and one or more LiDARs.

For the operation principle of the system for parking a truck accurately in a shore crane area, reference can be made to the method for parking a truck accurately in a shore crane area as shown in FIG. 2, and details thereof will be omitted here.

In the system for parking a truck accurately in a shore crane area, the LiDAR(s) can be 16-line, 32-line, or 64-line. The more laser beams there are, the easier it will be for the point cloud data obtained by scanning to cover the entire body of the scanned vehicle, and accordingly, the higher the cost will be. The hardware structures of the main controller and the vehicle controller have been described in "Exemplary Devices", and details thereof will be omitted here.

The system for parking a truck accurately in a shore crane area is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

In order to allow the LiDAR(s) to the lane(s) crossed by the shore crane, in a specific implementation, the LiDAR(s) can be installed on a mechanical device or a professional support frame at the site of operations for loading/unloading containers onto/from ships. Furthermore, in order to eliminate the need for the process of repeatedly installing and debugging the LiDAR(s) when the shore crane moves, in some embodiments, the LiDAR(s) can be fixedly installed on the shore crane (for example, at the bottom of the connecting beam), such that when the shore crane moves, the position(s) of the LiDAR(s) relative to the shore crane will not change, and the LiDAR(s) can always scan the lane(s) crossed by the shore crane.

In some embodiments, the main controller can be fixedly installed on the shore crane (for example, at the bottom of the connecting beam, or a control room of the shore crane), and is connected to the LiDAR(s).

In some embodiments, the vehicle controller can be provided on the truck to be parked.

In some embodiments, the vehicle controller may be a device provided outside the truck to be parked, such as a device fixedly installed in a certain place, or a device installed on any mobile device. In these embodiments, the vehicle controller can control the power system of the truck to be parked using any wireless communication scheme, such as base station and WIFI, to indirectly control the truck to be parked to stop.

In some embodiments, as shown in FIG. 3(*a*), the main controller, the LiDAR(s), and the lane(s) can be configured to in the following mode: each LiDAR is configured to scan only one lane crossed by the shore crane, and each main controller is configured to acquire the real-time point cloud data obtained by scanning using only one LiDAR.

In some embodiments, as shown in FIG. 3(*b*), the main controller, the LiDAR(s), and the lane(s) can be configured to in the following mode: each LiDAR is configured to scan at least two lanes crossed by the shore crane, and each main controller is configured to acquire the real-time point cloud data obtained by scanning using only one LiDAR.

In some embodiments, as shown in FIG. 3(*c*), the main controller, the LiDAR(s), and the lane(s) can be configured to in the following mode: each LiDAR is configured to scan only one lane crossed by the shore crane, and each main controller is configured to acquire the real-time point cloud data obtained by scanning using at least two LiDARs.

In some embodiments, as shown in FIG. 3(*d*), the main controller, the LiDAR(s), and the lane(s) can be configured to in the following mode: each LiDAR is configured to scan at least two lanes crossed by the shore crane, and each main controller is configured to acquire the real-time point cloud data obtained by scanning using at least two LiDARs.

In some embodiments, as shown in FIG. 11, the system may further include: a V2X device connected to the main controller, and a V2X device connected to the vehicle controller.

In some embodiments, as shown in FIG. 11, the system may further include: a power supply device configured to supply power to the main controller and/or the one or more LiDARs.

In some embodiments, the above power supply device can be configured to obtain power from a power supply system of the shore crane.

In some embodiments, the system may further include: an Uninterruptible Power Supply (UPS) configured to supply power to the main controller and/or the one or more LiDARs when the power supply device is off.

The objects, solutions, and advantageous effects of the present disclosure have been described above in detail. It is to be understood that the above embodiments of the present disclosure are illustrative only, rather than limiting the scope of the present disclosure. All modifications, equivalent, or improvements made within the spirit and scope of the present disclosure are to be encompassed by the scope of the present disclosure.

It should be noted that while the operations of the methods according to the present disclosure have been described in particular orders in the figures, it does not require or imply that these operations are necessarily to be performed in the particular orders, or that all the illustrated operations are necessarily to be performed to achieve the desired results. Additionally or alternatively, some steps may be omitted, a plurality of steps may be combined into one step, and/or one step may be divided into a plurality of steps for execution.

It can be appreciated by those skilled in the art that various illustrative logical blocks, units, and steps listed in the embodiments of the present disclosure can be implemented by electronic hardware, computer software, or any combination thereof. To clearly illustrate the interchangeability of hardware and software, the various illustrative components, units and steps described above have been generally described with respect to their functions. Whether such functions are to be implemented by hardware or software depends on design requirements of particular applications and the overall system. It can be appreciated by those skilled in the art that for each particular application, the described functions can be implemented using various methods, and such implementations should not be construed as being beyond the scope of the embodiments of the present disclosure.

The various illustrative logic blocks, or units, or devices described in the embodiments of the present disclosure may be implemented by general purpose processors, digital signal processors, Application Specific Integrated Circuits (ASICs), field programmable gate arrays or other programmable logic devices, discrete gates or transistor logics, discrete hardware components, or any combination or design thereof, so as to implement or operate the described functions. A general purpose processor may be a microprocessor. Alternatively, the general purpose processor may be any conventional processor, controller, microcontroller, or state machine. The processor may also be implemented by a combination of computing devices, such as a digital signal processor and a microprocessor, a plurality of microprocessors, one or more microprocessors in combination with a digital signal processor core, or any other similar configurations.

The steps of the method or algorithm described in the embodiments of the present disclosure may be directly embedded in hardware or software modules executed by a processor, or any combination thereof. The software modules can be stored in a RAM, a flash memory, a ROM, an EPROM, an EEPROM, a register, a hard drive, a removable magnetic disk, a CD-ROM, or any other form of storage medium in the art. As an example, the storage medium can be coupled to a processor such that the processor can read information from the storage medium and write information to the storage medium. Alternatively, the storage medium can be integrated into the processor. The processor and the storage medium may be disposed in an ASIC, which can be provided in a user terminal. Alternatively, the processor and the storage medium may also be provided in different components in the user terminal.

In one or more exemplary designs, the functions described above in the embodiments of the present disclosure may be implemented in hardware, software, firmware, or any combination thereof. When implemented in software, these functions may be stored on a computer readable medium or transmitted as one or more instructions or codes to a computer readable medium. Computer readable mediums may include computer storage mediums and communication mediums that facilitates transfer of computer programs from one place to another. The storage medium can be any available medium that any general purpose or special computer can access. For example, such computer readable mediums may include, but not limited to: RAMs, ROMs, EEPROMs, CD-ROMs or other optical storages, magnetic disk storages or other magnetic storage devices, or any other medium that can be used for carrying or storing program codes in instructions, data structures or any other forms that can be read by a general purpose or special computer or a general purpose or special processor. In addition, any connection can be appropriately defined as a computer readable medium. For example, if the software is transmitted from a website, a server, or any other remote sources through a coaxial cable, a fiber optic cable, a twisted pair, a Digital Subscriber Line (DSL) or wirelessly via e.g., infrared, radio, or microwave, it is also included in the defined computer readable medium. The disks and discs include compact disks, laser discs, optical discs, DVDs, floppy disks, and Blu-ray discs. The disks typically replicate data magnetically, while the discs typically optically replicate data with a laser. Any combination of the above may also be included in a computer readable medium.

What is claimed is:

1. A method, comprising:
   receiving a parking request for a vehicle to be parked from a vehicle controller;
   acquiring real-time point cloud data by scanning one or more lanes crossed by a shore crane using one or more LiDARs in response to receiving the parking request;
   clustering the real-time point cloud data to obtain a set of point clouds for the vehicle to be parked;
   obtaining a real-time distance from the vehicle to be parked to a target parking space based on the set of point clouds for the vehicle to be parked and a vehicle point cloud model, comprising:
      determining a vehicle model of the vehicle to be parked; and
      selecting the vehicle point cloud model matching the vehicle model of the vehicle to be parked from a model library, wherein the model library comprises a plurality of vehicle point cloud models obtained by scanning vehicles of a plurality of different vehicle models that are parked at the target parking space using the LiDAR in advance; and
   transmitting to the vehicle controller the real-time distance from the vehicle to be parked to the target parking space, such that the vehicle controller controls the vehicle to be parked to stop at the target parking space based on the real-time distance.

2. The method of claim 1, wherein said obtaining the real-time distance from the vehicle to be parked to the target parking space based on the set of point clouds for the vehicle to be parked and the vehicle point cloud model further comprises:
   applying an Iterative Closest Point (ICP) algorithm to the set of point clouds for the vehicle to be parked and the vehicle point cloud model matching the vehicle model of the vehicle to be parked.

3. The method of claim 1, wherein said selecting the vehicle point cloud model matching the vehicle model of the vehicle to be parked from the model library comprises:
   selecting, in response to determining that the vehicle to be parked carries a container, the vehicle point cloud model matching the vehicle model of the vehicle to be parked from a first model library, wherein the first model library comprises a plurality of vehicle point cloud models obtained by scanning vehicles of the plurality of different vehicle models that are parked at the target parking space and carrying containers using the LiDAR in advance; and selecting, in response to determining that the vehicle to be parked carries no container, the vehicle point cloud model matching the vehicle model of the vehicle to be parked from a second model library, wherein the second model library comprises a plurality of vehicle point cloud models obtained by scanning vehicles of the plurality of different vehicle models that are parked at the target parking space and carrying no container using the LiDAR in advance.

4. The method of claim 1, wherein said obtaining the real-time distance from the vehicle to be parked to the target parking space based on the set of point clouds for the vehicle to be parked and the vehicle point cloud model further comprises:

calculating a translation matrix from the set of point clouds for the vehicle to be parked to the vehicle point cloud model using an Iterative Closest Point (ICP) algorithm; and obtaining the real-time distance from the vehicle to be parked to the target parking space based on the translation matrix.

5. The method of claim 4, wherein said calculating the translation matrix from the set of point clouds for the vehicle to be parked to the vehicle point cloud model using the ICP algorithm comprises:

determining an initial translation matrix, the initial translation matrix being a matrix for translating an average center of a predetermined number of foremost points in a moving direction of the vehicle to be parked in the set of point clouds for the vehicle to be parked to an average center of the predetermined number of foremost points in the moving direction of the vehicle to be parked in the vehicle point cloud model, wherein coordinates of the average center are average values of coordinates of the predetermined number of points; and performing iterative calculation on the set of point clouds for the vehicle to be parked and the vehicle point cloud model based on the initial translation matrix, to obtain the translation matrix from the set of point clouds for the vehicle to be parked to the vehicle point cloud model.

6. The method of claim 4, wherein said calculating the translation matrix from the set of point clouds for the vehicle to be parked to the vehicle point cloud model using the ICP algorithm comprises:

parsing positioning data collected by a vehicle-mounted positioning device on the vehicle to be parked from the parking request;

determining an initial translation matrix, the initial translation matrix being a matrix for translating one or more points corresponding to the positioning data to one or more positioning points corresponding to the target parking space, the one or more positioning points being one or more points corresponding to positioning data obtained by the vehicle-mounted positioning device when the vehicle stops at the target parking space in a process for determining the vehicle point cloud model; and performing iterative calculation on the set of point clouds for the vehicle to be parked and the vehicle point cloud model based on the initial translation matrix, to obtain the translation matrix from the set of point clouds for the vehicle to be parked to the vehicle point cloud model.

7. The method of claim 1, wherein said receiving the parking request comprises:

receiving the parking request;

parsing a shore crane identification from the parking request;

matching the shore crane identification with a shore crane corresponding to itself; and establishing a communication connection with the vehicle controller when the shore crane identification matches the shore crane.

8. The method of claim 1, wherein said clustering the real-time point cloud data to obtain the set of point clouds for the vehicle to be parked comprises:

parsing positioning data collected by a vehicle-mounted positioning device on the vehicle to be parked from the parking request;

clustering the real-time point cloud data based on the positioning data to obtain the set of point clouds for the vehicle to be parked.

9. The method of claim 1, wherein said clustering the real-time point cloud data to obtain the set of point clouds for the vehicle to be parked comprises:

parsing positioning data collected by a vehicle-mounted positioning device on the vehicle to be parked from the parking request;

extracting, from the real-time point cloud data, point cloud data corresponding to a position corresponding to the positioning data and an area within a predetermined length around the position; and clustering the extracted point cloud data to obtain the set of point clouds for the vehicle to be parked.

10. The method of claim 1, wherein said clustering the real-time point cloud data to obtain the set of point clouds for the vehicle to be parked comprises:

parsing a number of a lane where the vehicle to be parked is located from the parking request;

extracting, from the real-time point cloud data, point cloud data of the lane where the vehicle to be parked is located based on the number of the lane where the vehicle to be parked is located and a known position of each lane crossed by the shore crane relative to the one or more LiDARs;

clustering the real-time point cloud data based on the point cloud data of the lane where the vehicle to be parked is located, to obtain the set of point clouds for the vehicle to be parked.

11. The method of claim 1, wherein said clustering the real-time point cloud data to obtain the set of point clouds for the vehicle to be parked comprises:

parsing a number of a lane where the vehicle to be parked is located from the parking request; and extracting, from the real-time point cloud data, point cloud data of the lane where the vehicle to be parked is located based on the number of the lane where the vehicle to be parked is located and a known position of each lane crossed by the shore crane relative to the one or more LiDARs; and clustering the extracted point cloud data to obtain the set of point clouds for the vehicle to be parked.

12. A vehicle, comprising a vehicle controller, wherein the vehicle controller comprises:

a processor, a memory, and a computer program stored on the memory and executable on the processor,
wherein the processor is configured to, when executing the computer program, perform an operation comprising:
transmitting a parking request;
receiving a real-time distance from the vehicle to a target parking space from a main controller in response to the parking request; and
controlling the vehicle to stop at the target parking space based on the real-time distance from the vehicle to the target parking space,
wherein the real-time distance from the vehicle to the target parking space is calculated by:
acquiring real-time point cloud data obtained by scanning one or more lanes crossed by a shore crane using one or more LiDARs;
clustering the real-time point cloud data to obtain a set of point clouds for the vehicle; and
obtaining the real-time distance from the vehicle to the target parking space based on the set of point clouds for the vehicle and a vehicle point cloud model, comprising:
determining a vehicle model of the vehicle; and
selecting the vehicle point cloud model matching the vehicle model of the vehicle from a model library, wherein the model library comprises a plurality of vehicle point cloud models obtained by scanning vehicles of a plurality of different vehicle models that are parked at the target parking space using the LiDAR in advance.

13. The vehicle of claim 12, wherein the vehicle controller is connected to a throttle control system and a brake system of the vehicle.

14. The vehicle of claim 12, further comprising:
a Vehicle to Everything (V2X) device connected to the vehicle controller.

15. The vehicle of claim 12, wherein the parking request comprises one or more of:
a vehicle identification of the vehicle,
a vehicle model of the vehicle,
positioning data collected by a vehicle-mounted positioning device on the vehicle,
a number of a lane where the vehicle is located,
information indicating whether the vehicle carries a container, and
a shore crane identification.

16. The vehicle of claim 12, wherein the operation further comprises:
determining whether the vehicle carries a container by detecting whether there is an object at a predetermined distance from a head of the vehicle in a horizontal direction above a load board; and
generating information indicating whether the vehicle carries a container based on a result of the detecting.

17. The vehicle of claim 12, wherein the operation further comprises:
receiving an operation command for loading or unloading a container;
parsing shore crane identification from the operation command for loading or unloading the container; and
controlling the vehicle to move to the shore crane corresponding to the shore crane identification.

18. The vehicle of claim 12, wherein transmitting the parking request comprises:
transmitting the parking request in response to a distance between the vehicle and the shore crane being smaller than or equal to a predetermined distance, or in response to the shore crane being detected.

19. A non-transitory computer readable storage medium, having a computer program stored thereon, the computer program, when executed by a processor, causes the processor to:
receive a parking request for a vehicle to be parked from a vehicle controller;
acquire real-time point cloud data by scanning one or more lanes crossed by a shore crane using one or more LiDARs in response to receiving the parking request;
cluster the real-time point cloud data to obtain a set of point clouds for the vehicle to be parked;
obtain a real-time distance from the vehicle to be parked to a target parking space based on the set of point clouds for the vehicle to be parked and a vehicle point cloud model;
determine a vehicle model of the vehicle to be parked;
select the vehicle point cloud model matching the vehicle model of the vehicle to be parked from a model library, wherein the model library comprises a plurality of vehicle point cloud models obtained by scanning vehicles of a plurality of different vehicle models that are parked at the target parking space using the LiDAR in advance; and
transmit to the vehicle controller the real-time distance from the vehicle to be parked to the target parking space, such that the vehicle controller controls the vehicle to be parked to stop at the target parking space based on the real-time distance.

20. The method of claim 1, wherein the vehicle to be parked is a truck.

* * * * *